United States Patent [19]

Kanbe et al.

[11] Patent Number: 5,032,485
[45] Date of Patent: Jul. 16, 1991

[54] DEVELOPING METHOD FOR ONE-COMPONENT DEVELOPER

[75] Inventors: Junichiro Kanbe; Tsutomu Toyono; Nagao Hosono; Tohru Takahashi, all of Tokyo, Japan

[73] Assignee: Canon Kabushiki Kaisha, Tokyo, Japan

[21] Appl. No.: 545,134

[22] Filed: Jun. 27, 1990

Related U.S. Application Data

[60] Continuation of Ser. No. 455,133, Dec. 22, 1989, abandoned, which is a division of Ser. No. 22,598, Mar. 4, 1987, Pat. No. 4,913,088, which is a division of Ser. No. 745,994, Jun. 17, 1985, abandoned, which is a continuation of Ser. No. 492,440, May 6, 1983, abandoned, which is a division of Ser. No. 264,516, May 18, 1981, Pat. No. 4,395,476, which is a continuation of Ser. No. 58,434, Jul. 18, 1979, abandoned.

[30] Foreign Application Priority Data

| Jul. 28, 1978 | [JP] | Japan | 53-92105 |
| Jul. 28, 1978 | [JP] | Japan | 53-92106 |
| Jul. 28, 1978 | [JP] | Japan | 53-92107 |
| Apr. 28, 1979 | [JP] | Japan | 54-52641 |
| Jun. 1, 1979 | [JP] | Japan | 54-68562 |

[51] Int. Cl.$^5$ .......................................... G03G 13/08
[52] U.S. Cl. ................................. 430/120; 430/903
[58] Field of Search ................. 430/120, 106.6, 903

[56] References Cited

U.S. PATENT DOCUMENTS

| 2,758,525 | 8/1956 | Moncrieff-Yeates | 95/1.3 |
| 2,803,177 | 8/1957 | Lowrie | 95/1.7 |
| 2,838,997 | 6/1958 | Moncrieff-Yeates | 101/426 |
| 2,839,400 | 6/1959 | Moncrieff-Yeates | 96/1 |
| 2,862,816 | 12/1958 | Moncrieff-Yeates | 96/1 |
| 2,996,400 | 8/1961 | Rudd et al. | 117/17.5 |
| 3,232,190 | 2/1966 | Wilmott | 95/1.7 |
| 3,346,475 | 10/1967 | Matkan et al. | 204/181 |
| 3,639,245 | 2/1972 | Nelson | 252/62.1 |
| 3,643,629 | 2/1972 | Kangas et al. | 118/637 |
| 3,703,157 | 11/1972 | Maksymiak et al. | 118/637 |
| 3,720,617 | 3/1973 | Chatterji et al. | 252/62.1 |
| 3,731,146 | 5/1973 | Bettiga et al. | 317/3 |
| 3,818,864 | 6/1974 | Bickmore | 118/637 |
| 3,866,574 | 2/1975 | Hardennrook et al. | 118/637 |
| 3,890,929 | 6/1975 | Walkup | 118/637 |
| 3,893,418 | 7/1975 | Liebman et al. | 118/637 |
| 3,918,966 | 11/1975 | Metcalfe et al. | 96/1 |
| 4,011,834 | 3/1977 | Stephan | 118/653 |
| 4,014,291 | 3/1977 | Davis | 118/657 |
| 4,076,857 | 2/1978 | Kasper et al. | 427/18 |
| 4,102,305 | 7/1978 | Schwarz | 118/651 |
| 4,121,931 | 10/1978 | Nelson | 96/1 |
| 4,126,100 | 11/1978 | Nishihama et al. | 118/658 |
| 4,292,387 | 9/1981 | Kanbe et al. | 430/102 |
| 4,473,627 | 9/1984 | Kanbe et al. | 430/102 |

FOREIGN PATENT DOCUMENTS

| 46-5782 | 12/1971 | Japan . |
| 48-38735 | 6/1973 | Japan . |
| 49-17739 | 2/1974 | Japan . |
| 1431699 | 4/1973 | United Kingdom . |
| 1549133 | 6/1977 | United Kingdom . |

*Primary Examiner*—John Goodrow
*Attorney, Agent, or Firm*—Fitzpatrick, Cella, Harper & Scinto

[57] ABSTRACT

This specification discloses a method of toner transfer development in which a low frequency alternating electrical bias is applied to the space between a latent image bearing member and a developer carrying member to develop the latent image on the latent image bearing member, and an apparatus for carrying out the same method. This bias has a first process in which reciprocal movement of developer particles is effected also between the non-image area of the latent image bearing member and the developer carrying member, and a second process in which the intensity of the bias is adjusted so that one-sided movement of developer particles from the developer carrying member to the image area and one-sided movement of developer particles from the non-image area to the developer carrying member may take place.

8 Claims, 14 Drawing Sheets

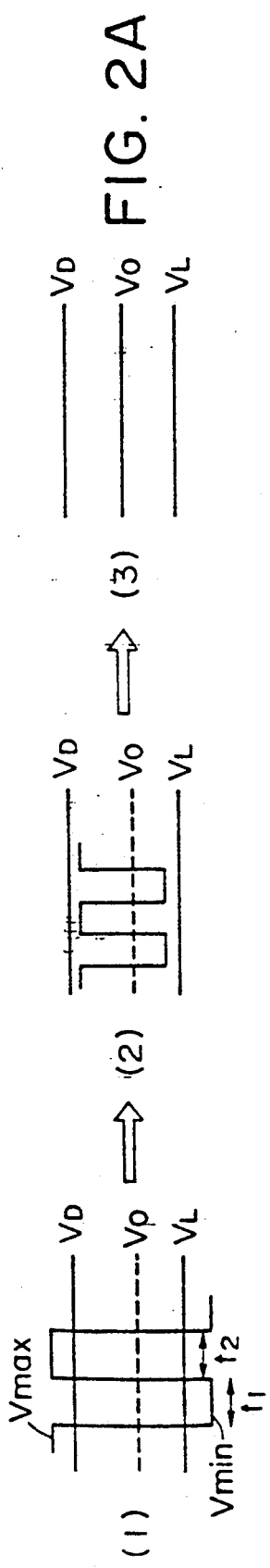
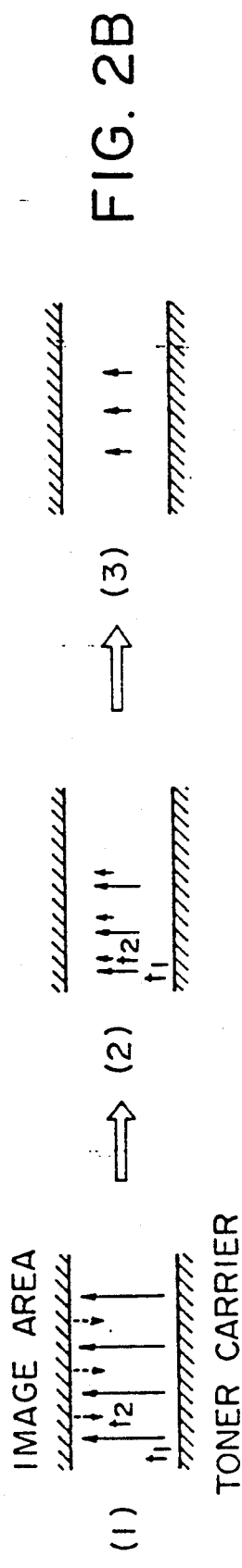
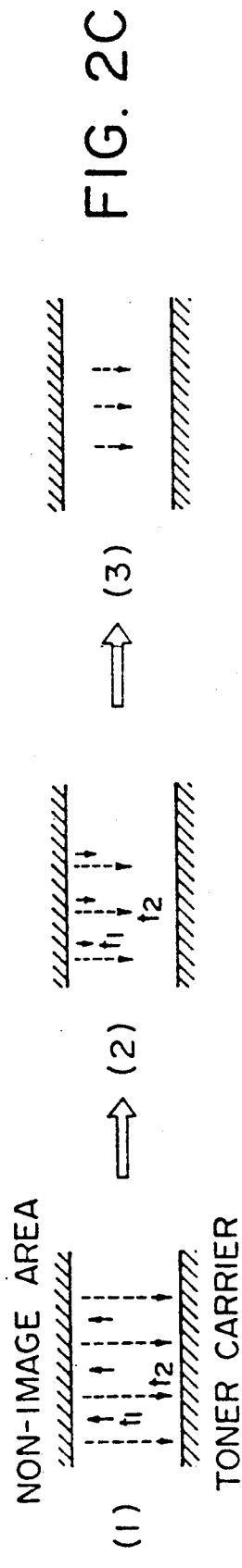

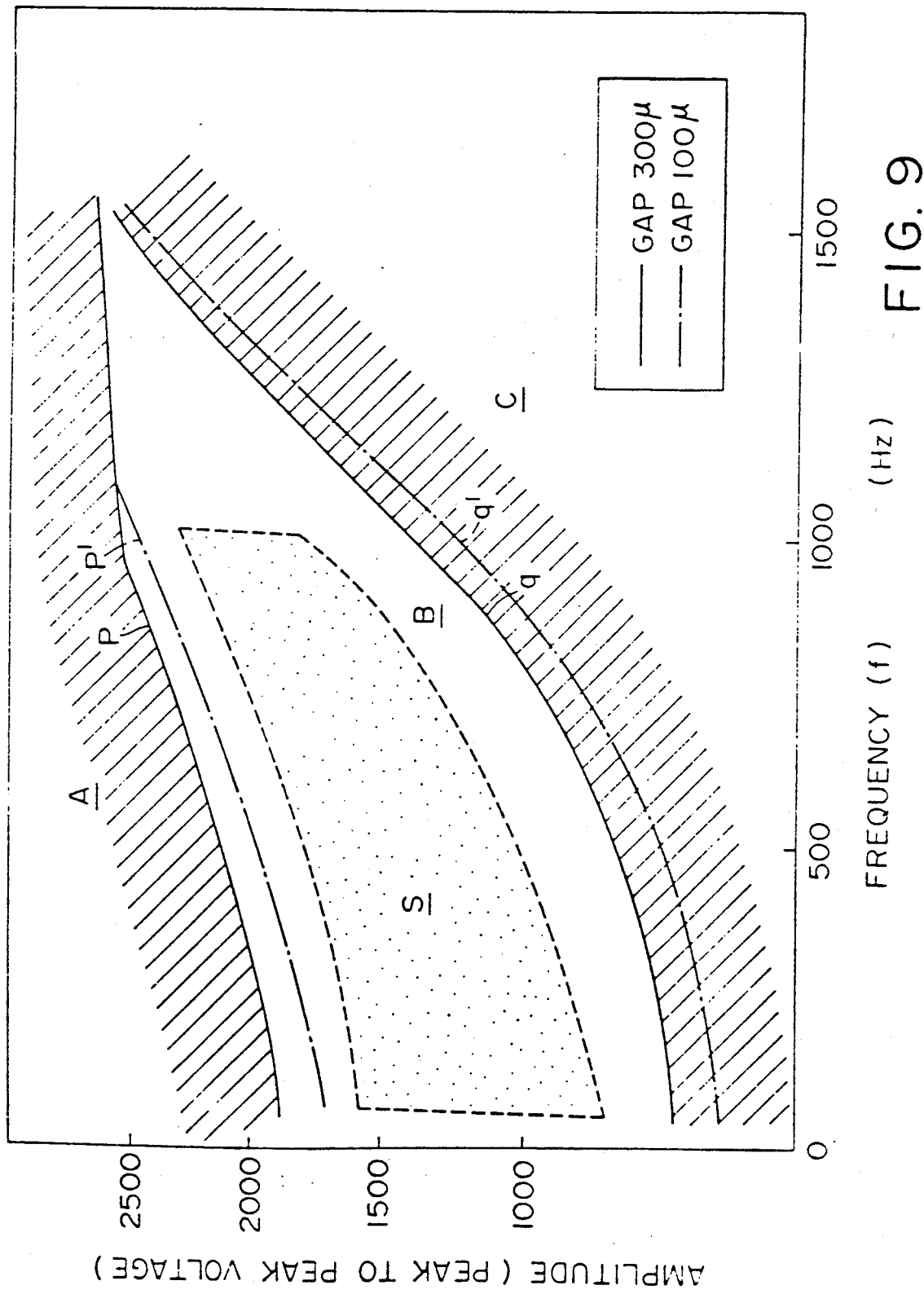

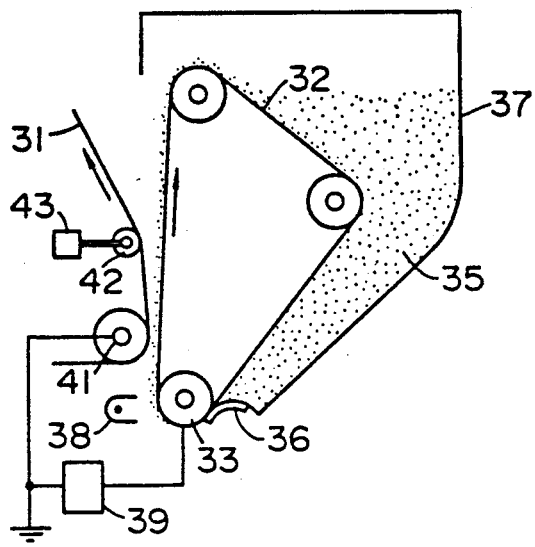
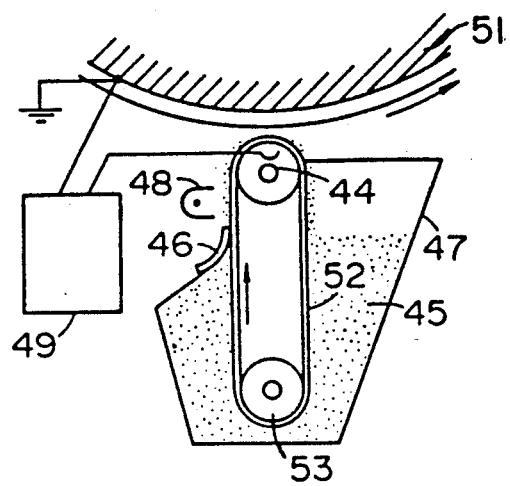
FIG. 11    FIG. 12
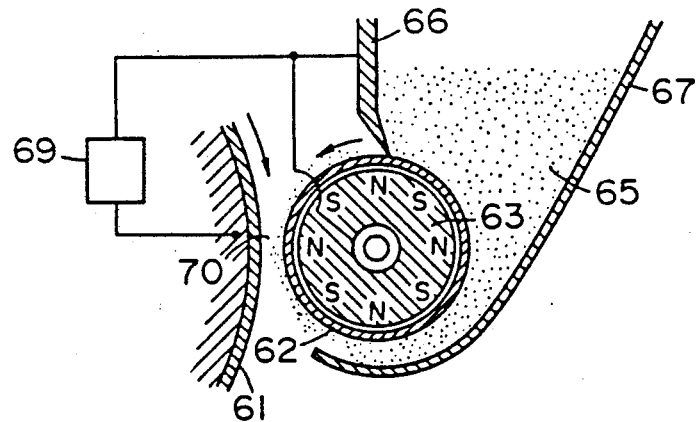
FIG. 13A
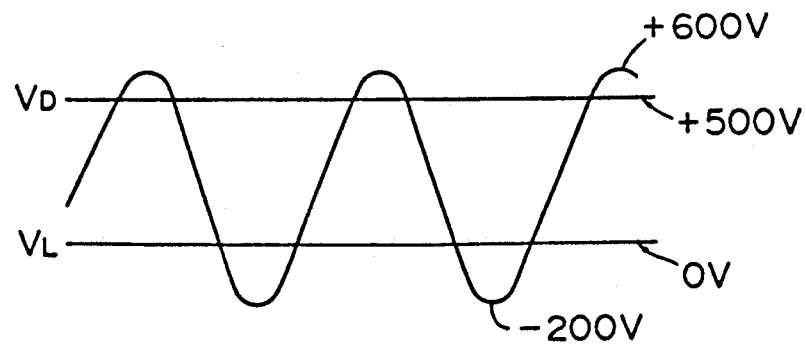
FIG. 13B

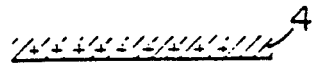
FIG. 15A
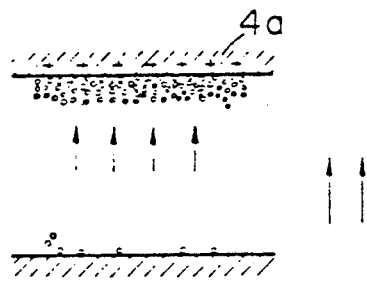
FIG. 15B
FIG. 15C
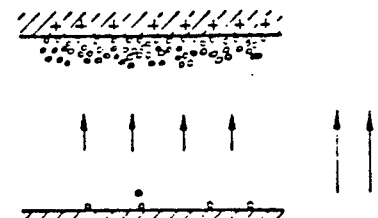
FIG. 15D
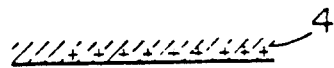
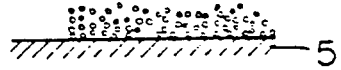
FIG. 16A
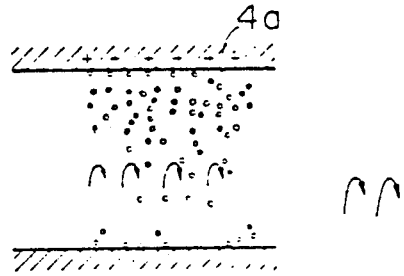
FIG. 16B
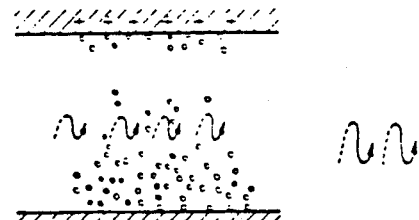
FIG. 16C
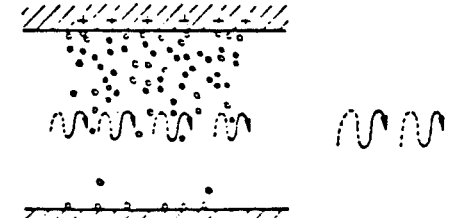
FIG. 16D

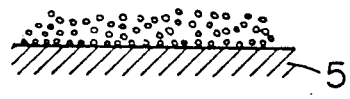
FIG. 17A
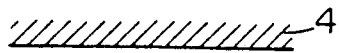
FIG. 18A
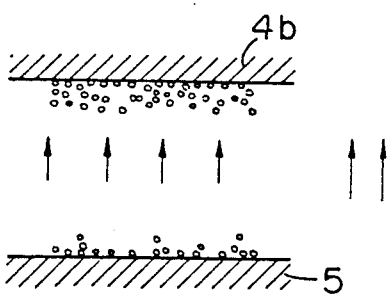
FIG. 17B
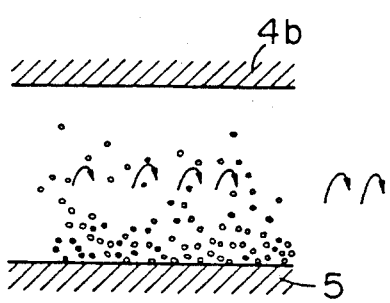
FIG. 18B
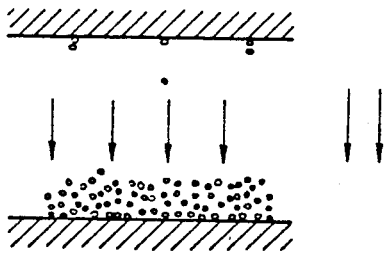
FIG. 17C
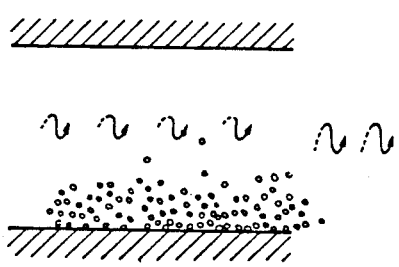
FIG. 18C
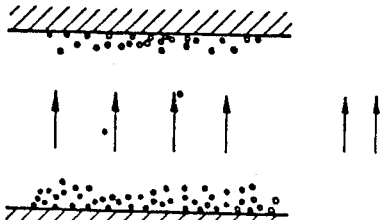
FIG. 17D
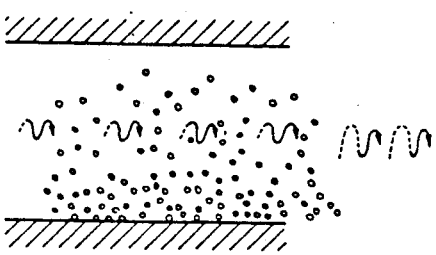
FIG. 18D

DEVELOPING METHOD FOR ONE-COMPONENT DEVELOPER

This application is a continuation of application Ser. No. 07/455,133 filed Dec. 22, 1989, now abandoned, which is a division of application Ser. No. 07/022,598 filed Mar. 4, 1987, now U.S. Pat. No. 4,913,088, issued Apr. 3, 1990, which is a division of application Ser. No. 06/745,994 filed June 17, 1985, abandoned, which is a continuation of application Ser. No. 06/492,440 filed May 6, 1983, now abandoned, which is a division of application Ser. No. 06/264,516 filed May 18, 1981, now U.S. Pat. No. 4,395,476, issued July 26, 1983, which is a continuation of application Ser. No. 06/058,434 filed July 18, 1979, now abandoned.

BACKGROUND OF THE INVENTION

1. Field of the Invention

This invention relates to a developing method for developing a latent image by the use of a developer and an apparatus therefor, and more particularly to a developing method using a one-component developer, especially a developing method which enables production of fogless visible images excellent in sharpness and tone reproduction, and an apparatus therefor.

2. Description of the Prior Art

Various types of developing methods using a one-component developer are heretofore known such as the powder cloud method which uses toner particles in cloud condition, the contact developing method in which a uniform toner layer formed on a toner supporting member comprising a web or a sheet is brought into contact with an electrostatic image bearing surface to effect development, and the magnedry method which uses a conductive magnetic toner formed into a magnetic brush which is brought into contact with the electrostatic image bearing surface to effect development.

Among the above-described various developing methods using one-component developer, the powder cloud method, the contact developing method and the magnedry method are such that the toner contacts both the image area (the area to which the toner should adhere) and the non-image area (the background area to which the toner should not adhere) and therefore, the toner more or less adheres to the non-image area as well, thus unavoidably creating the so-called fog.

To avoid such fog, there has been proposed the transfer development with space between toner donor and image bearing member in which a toner layer and an electrostatic image bearing surface are disposed in opposed relationship with a clearance therebetween in a developing process so that the toner is caused to fly to the image area by the electrostatic field thereof and the toner does not contact the non-image area. Such development is disclosed, for example, in U.S. Pat. Nos. 2,803,177; 2,758,525; 2,838,997; 2,839,400; 2,862,816; 2,996,400; 3,232,190 and 3,703,157. This development is a highly effective method in preventing the fog. Nevertheless, the visible image obtained by this method generally suffers from the following disadvantages because it utilizes the flight of the toner resulting from the electric field of the electrostatic image during the development.

A first disadvantage is the problem that the sharpness of the image is reduced at the edges of the image. The state of the electric field of the electrostatic image at the edge thereof is such that if an electrically conductive member is used as the developer supporting member, the electric lines of force which emanate from the image area reach the toner supporting member so that the toner particles fly along these electric lines of force and adhere to the surface of the photosensitive medium, thus effecting development in the vicinity of center of the image area. At the edges of the image area, however, the electric lines of force do not reach the toner supporting member due to the charge induced at the non-image area and therefore, the adherence of the flying toner particles is very unreliable and some of such toner particles barely adhere while some of the toner particles do not adhere. Thus, the resultant image is an unclear one lacking sharpness at the edges of the image area, and line images, when developed, give an impression of having become thinner than the original lines.

To avoid this in the above-described toner transfer development, the clearance between the electrostatic image bearing surface and the developer supporting member surface must be sufficiently small (e.g. smaller than $100\mu$) and actually, accidents such as pressure contact of the developer and mixed foreign substances are liable to occur between the two surfaces. Also, maintaining such a fine clearance often involves difficulties in designing of the apparatus.

A second problem is that images obtained by the above-described toner transfer development usually lack tone reproducibility. In the toner transfer development, the toner does not fly until the toner overcomes the binding power to the toner supporting member by the electric field of the electrostatic image. This power which binds the toner to the toner supporting member is the resultant force of the Van der Waals force between the toner and the toner supporting member, the force of adherence among the toner particles, and the reflection force between the toner and the toner supporting member resulting from the toner being charged. Therefore, flight of the toner takes place only when the potential of the electrostatic image has become greater than a predetermined value (hereinafter referred to as the transition threshold value of the toner) and the electric field resulting therefrom has exceeded the aforementioned binding force of the toner, whereby adherence of the toner to the electrostatic image bearing surface takes place. But the binding power of the toner to the supporting member differs in value from particle to particle or by the particle diameter of the toner even if the toner has been manufactured or prepared in accordance with a predetermined prescription, and therefore, it is considered to be distributed narrowly around a substantially constant value and correspondingly, the threshold value of the electrostatic image surface potential at which the flight of toner takes place also seems to be distributed narrowly around a certain constant value. Such presence of the threshold value during the flight of the toner from the supporting member causes adherence of the toner to that part of the image area which has a surface potential exceeding such threshold value, but causes little or no toner to adhere to that part of the image area which has a surface potential lower than the threshold value, with a result that there are only provided images which lack the tone gradation having steep $\gamma$ (the gradient of the characteristic curve of the image density with respect to the electrostatic image potential).

In view of such problems, a developing device in which a pulse bias of very high frequency is introduced across an air gap to ensure movement of charged toner particles flying through the air gap, whereby the charged toner particles are made more readily available to the charged image is disclosed in U.S. Pats. Nos. 3,866,574; 3,890,929 and 3,893,418.

Such high frequency pulse bias developing device may be said to be a developing system suitable for the line copying in that a pulse bias of several KHz or higher is applied in the clearance between the toner donor member and the image retaining member to improve the vibratory characteristic of the toner and prevent the toner from reaching the non-image area in any pulse bias phase but cause the toner to transit only to the image area, thereby preventing fogging of the non-image area. However, the aforementioned U.S. Pat. No. 3,893,418 states that a very high frequency (18 KHz–22 KHz) is used for the applied pulse voltage in order to make the device suitable for the reproduction of tone gradation of the image.

U.S. Pat. No. 3,346,475 discloses a method which comprises immersing two electrodes in insulating liquid contained in a dielectrophoretic cell and applying thereto an AC voltage of very low frequency (lower than about 6 Hz) to thereby effect the development of a pattern corresponding to the conductivity variance.

Further, U.S. Pat. No. 4,014,291 discloses a transfer development which uses dry one-component magnetic toner, but this patent does not suggest that a bias is applied for the above-described purpose of preventing fog.

SUMMARY OF THE INVENTION

The present invention has been made to eliminate the above-noted problems peculiar to the various developing methods using one-component developer, and it is a primary object of the invention to provide a developing method which enables obtainment of visible images which are free of fog and excellent in edge reproduction and tone gradation, and an apparatus therefor.

It is another object of the present invention to provide a developing method based on the principle of development in which a low frequency alternating electric field having a phase of a particular polarity which causes the developer to one-sidedly reach both the image area and the non-image area of a latent image bearing member from a developer carrier and a phase of the opposite polarity to the particular polarity which applies a bias in a direction to cause the developer having reached at least the non-image area to return to the developer carrier side is applied in the developing clearance to thereby ensure transition of the developer to the non-image area and back transition of the developer to the developer carrier to be alternately repeated even in the clearance between the developer carrier and the non-image area in the developing station and enable a development very excellent in tone reproduction to be accomplished by such reciprocal movement of the developer, and an apparatus therefor.

It is still another object of the present invention to provide a developing method which has a first process in which an extraneous vibratory electric field is imparted so that the low frequency electric field in the developing clearance may alternate in at least the non-image area of the latent image bearing member, whereby reciprocal movement of the developer particles may take place between the non-image area and the developer carrier, and a second process in which the intensity of the extraneous vibratory electric field is adjusted to cause one-sided transition of the developer particles from the developer carrier to the image area and from the non-image area to the developer carrier, thereby obtaining a result of development which is free of fog and excellent in tone gradation, and an apparatus therefor.

It is yet still another object of the present invention to provide a developing method in which the second process is imparted in a process in which the latent image bearing member and the developer carrier are stationary and opposed to each other and the amplitude of the extraneously applied vibratory electric field is attenuated toward the termination of the development and converted into a predetermined value, and an apparatus therefor.

It is a further object of the present invention to provide a developing method in which the extraneously applied vibratory alternating voltage is maintained constant and the latent image bearing member and the developer carrier are opposed to each other while being moved to increase the clearance therebetween gradually, to thereby inpart the second process, and an apparatus therefor.

It is a further object of the present invention to provide a developing method which comprises disposing a latent image bearing member and a developer carrier carrying a developer layer thereon in opposed relationship in a developing station with a clearance maintained therebetween, the clearance being greater than the thickness of the developer layer, and effecting development while applying an alternating electric field in a range satisfying $$400 \text{ V} \leq V_{p-p} \leq 2500 \text{ V}$$

$$40 \text{ Hz} \leq f \leq 1.5 \text{ KHz}$$

where $V_{p-p}$ represents the amplitude of the alternating electric field (V: peak-to-peak value) and f represents the alternating frequency of the alternating electric field, to apply an alternating electric field having a phase of a particular polarity which causes the developer to one-sidedly reach both the image area and the non-image area of the latent image bearing member from the developer carrier in the developing clearance and a phase of the opposite polarity to the particular polarity for applying a bias in a direction to cause the developer having reached at least the non-image area to return to the developer carrier side, and an apparatus therefor.

It is a further object of the present invention to provide a developing method which comprises disposing a latent image bearing member and a developer carrier in opposed relationship in a developing station with a clearance maintained therebetween, and effecting development by applying to the clearance an alternating voltage of a frequency lower than 1.5 KHz, the frequency and amplitude value of the alternating voltage being selectively changed over in accordance with the kind of the image to be reproduced, and an apparatus therefor.

Other objects and features of the present invention will become apparent from the following detailed description of some embodiments of the invention taken in conjunction with the accompanying drawings.

BRIEF DESCRIPTION OF THE DRAWINGS

FIG. 9 is a graph illustrating the range of selection of the amplitude versus frequency of the applied alternating electric field as the result of the experiment effected on the developing method according to the present invention.

FIG. 13 B illustrates the voltage waveform applied to the apparatus shown in FIG. 13 A.

FIGS. 15 A-D to FIGS. 18 A-D illustrate the process of movement and vibration of the developer to the image area and the non-image area in the process of development.

DESCRIPTION OF THE PREFERRED EMBODIMENTS

Figure 1:
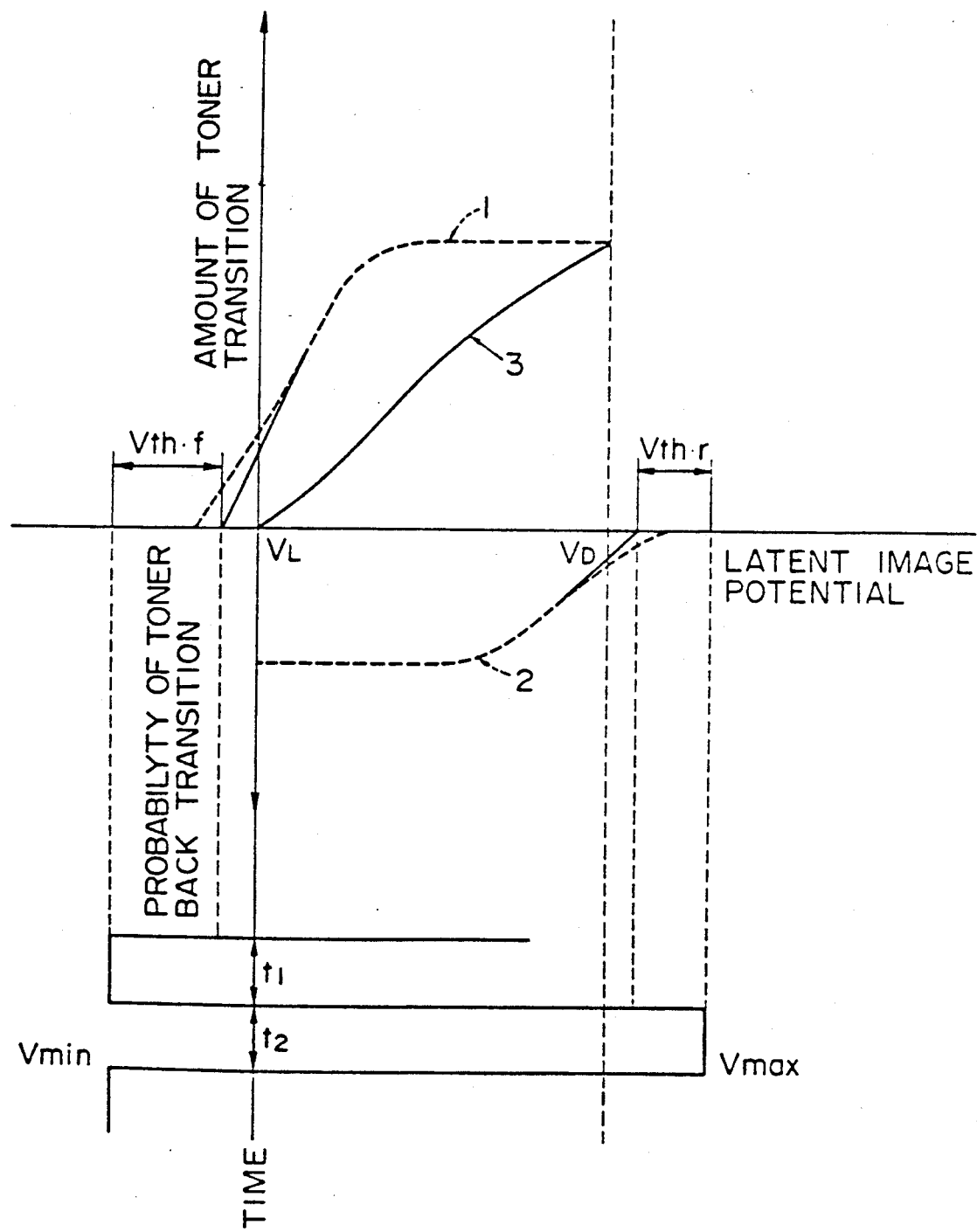
FIG. 1 illustrates the amount of transition of the toner and the characteristic of the degree of toner back transition for the potential of a latent image, as well as an example of the voltage waveform applied.

Reference in first had to FIG. 1 to describe the principle of fog prevention and enhanced tone reproduction of visualized image which may be expressed as the objects and effects of the present invention.

FIG. 1 is a graph in which the abscissa represents the electrostatic image potential and the ordinate represents the amount of transition of toner from a developer carrier (hereinafter also referred to as the toner carrier) to an electrostatic image bearing surface (positive direction) or the degree of back transition of toner which means that the toner having adhered to the electrostatic image bearing surface is stripped off therefrom (the degree of transition in the negative direction will hereinafter be described). The electrostatic image potential is represented with the non-image area potential $V_L$ (which is usually the potential of the surface in a region corresponding to the light portion of an image and has a minimum value as the potential) and the image area potential (which is usually the potential of the surface in a region corresponding to the dark portion of the image and has a maximum value as the potential) as the potentials at the ends. The surface potential of the half-tone region of the image including half-tone assumes a potential intermediate $V_D$ and $V_L$ value to the degree of that tone.

In the lower portion of FIG. 1, the voltage waveform applied to the toner carrier is depicted with the abscissa representing the potential and with the ordinate representing the time. A rectangular wave is exemplarily shown there, whereas waveform is not restricted to such waveform. The rectangular wave shown exemplarily is such a periodical alternating waveform that the minimum voltage $V_{min}$ of the toner carrier with the back electrode of the electrostatic image bearing member as the standard is applied in a time interval $t_1$ and the bias voltage of the maximum voltage $V_{max}$ is applied in a time interval $t_2$.

The image area potential $V_D$ assumes a positive potential in some cases and assumes a negative potential in other cases, depending on the electrostatic image formation process used, and this also holds true with the non-image area potential $V_L$. Herein, however, to make the invention more easily understood, description will be made with respect to the case where $V_D$ is a positive potential. Of course, this is only for the purpose of illustration and the invention is not restricted thereto. When $V_D > 0$, the relation between $V_D$ and the non-image area potential $V_L$ becomes $V_D > V_L$. Now, if the relation between the maximum voltage $V_{max}$ and the minimum voltage $V_{min}$ applied to the toner carrier and $V_L$ is set the satisfy.

$$V_{max} > V_L > V_{min} \quad (1),$$

the bias voltage $V_{min}$ acts to cause toner particles to transit from the toner carrier toward the electrostatic image bearing member at the time interval $t_1$ and therefore, this stage is called the toner transition stage. At the time interval $t_2$, the bias voltage $V_{max}$ acts with a tendency to cause the toner which has transited to the electrostatic image bearing member in the time interval $t_1$ to be returned to the toner carrier and therefore this stage is called the toner back transition stage.

In the upper portion of FIG. 1, the amount of toner transition at $t_1$ and the degree of toner back transition at $t_2$ are plotted with respect to the electrostatic image potential. Here, the term "degree of toner back transition" is used to represent the probability of the toner back transition which takes place from the electrostatic image bearing member back to the toner carrier if the bias voltage $V_{max}$ is applied in a supposed case that toner as a uniform layer adheres to both the image area and the non-image area of the electrostatic image bearing member.

Now, the amount of toner transition from the toner carrier to the electrostatic image bearing member in the toner transition stage is such as indicated by curve 1 shown by broken line in FIG. 1. The gradient of this curve is substantially equal to the gradient of the curve obtained when no bias alternate voltage is applied. This gradient is great and the amount of the toner transition tends to be saturated at a value intermediate $V_L$ and $V_D$ and accordingly, it is not suited for the reproduction of half-tone images and provides poor tone gradation. Curve 2 indicated by another broken line in FIG. 1 represents the aforementioned probability of the toner back transition in the toner back transition stage.

In the developing method according to the present invention, an alternating electric field is imparted so that such toner transition stage and toner back transition are alternately repeated and in the bias phase ($t_1$) of the toner transition stage of the alternating electric field, toner is caused to once reach even the non-image area of the electrostatic image bearing member (of course, the toner is caused to reach the image area as well), and the toner is also caused to sufficiently adhere to the half-tone potential portion having a low potential approximate to the light region potential ($V_L$) to thereby enhance the tone reproduction, whereafter in the bias phase ($t_2$) of the toner back transition stage, the bias is caused to act in the direction opposite to the direction of toner transition to thereby cause the toner having reached the non-image area to be returned to the toner carrier. In this toner back transition stage, as will hereinafter the described, the toner having reached the non-image area as described tends to return to the toner carrier from the non-image area as soon as the bias field of the opposite polarity is applied, because the non-image area originally have no image potential. On the other hand, since the toner having once adhered to the image area including the half-tone area is attracted to the image area charge, little amount of toner actually returns to the toner carrier from the image area even if the reverse bias is applied in the direction opposite to this attraction. By so causing the bias fields of the opposite polarities to alternate at a preferable amplitude and frequency, the toner transition and back transition may be repeated a number of times at the developing station. Thus, the amount of the toner transiting to the latent image surface may be rendered, to an amount of transition faithful to the potential of the electrostatic image. That is, it is possible to provide a developing action which may result in a variation in amount of toner transition having a small gradient and substantially uniform from the potential $V_L$ to $V_D$ as shown by curve 3 in FIG. 1. Accordingly, practically no toner adheres to the non-image area while, on the other hand, the adherence of the toner to the half-tone image areas is so good that there is provided an excellent visible image having a very good tone reproduction corresponding to the surface potential thereof. This tendency may be made more pronounced by setting the clearance between the electrostatic image bearing member and the toner carrier so that it is greater toward the end of the developing process and by decreasing and converging the intensity of the above-described field in the developing clearance.

As a method of adjusting the intensity of such electric field in the developing clearance, there is a first method of gradually converging the applied alternating voltage to a suitable predetermined DC value, and a second method of increasing the developing clearance itself with the developing time. These two methods will hereinafter be described respectively.

Figure 2D:
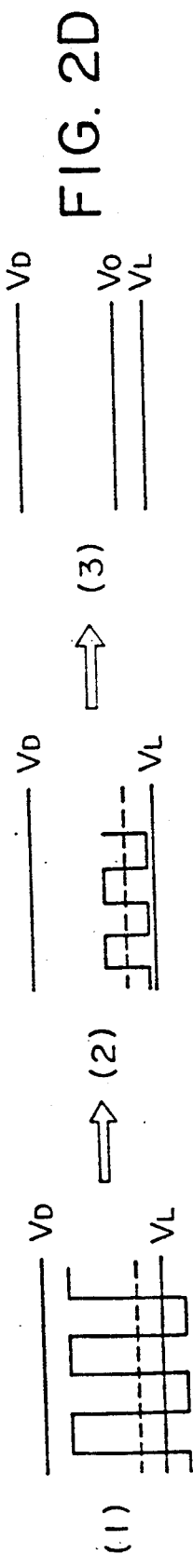
FIGS. 2 A-F and FIGS. 3 A and B illustrate the developing process of the developing method according to the present invention.
Figure 2E:
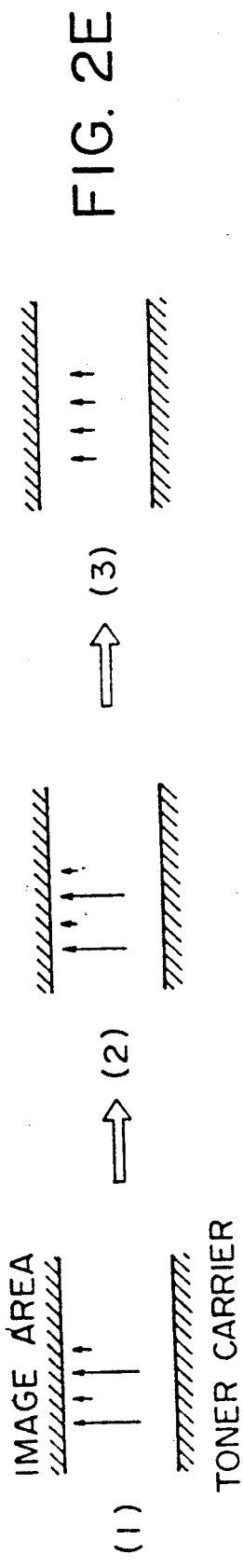
Figure 2F:
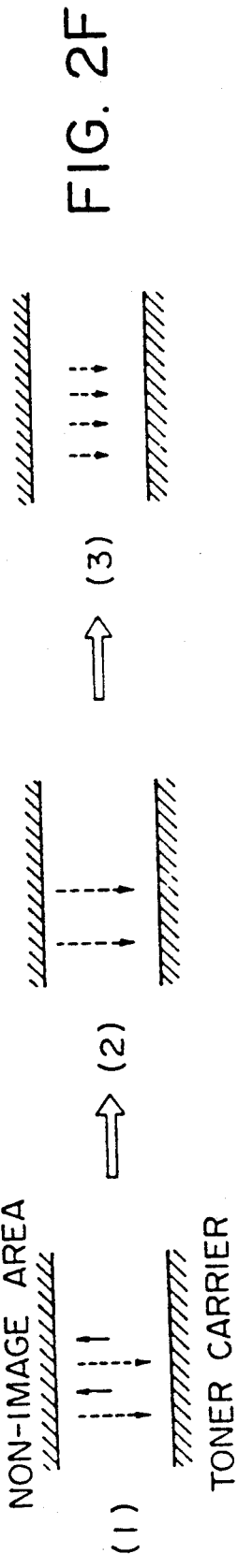

The developing process in the first method is shown in FIGS. 2 A-D.

FIG. 2 A shows, in order of (1), (2) and (3), the variation with time in an example of the waveform of the applied alternating voltage in the case of the above-mentioned first method. Of course, both of continuous variation and intermittent variation are possible, and in the case of continuous variation, (2) in the shown example shows the intermediate state of the variation.

FIGS. 2 B and C exemplarily show the manner of toner transition and toner back transition in the image area and the non-image area of the electrostatic image bearing member, with the variation in the developing time. In these Figures, the direction of solid-line arrows shows the electric field in the toner transition direction, and the length of the arrows represents the intensity of the electric field. Broken line arrows show the electric field in the toner back transition direction and the length thereof represents the intensity of the electric field.

In FIGS. 2 A-C, the initial process (1) is called a first process, and the process (2) from an intermediate stage (which will later be described in greater detail) to the termination is called a second process. (3) designates the termination of the development whereat the alternation of the applied voltage is terminated and the voltage is converged to an appropriate predetermined DC value ($V_O$) intermediate $V_D$ and $V_L$.

It is important that the action of the opposite polarity to the toner transition in the image area and the non-image area in the first and the second process is varied. This status will be described phenomenologically. First, in the image area, as exemplarily shown in FIG. 2 B, $V_{max} > V_D > V_{min}$ in the first process (1) and therefore, in the time period $t_1$ (applied voltage is $V_{min}$), a relatively strong toner transition field occurs from the toner carrier toward the image area of the electrostatic image bearing member and toner reaches and adheres to the image area. On the other hand, in the time period $t_2$ (applied voltage is $V_{max}$), a relatively weak toner back transition field occurs toward the electrostatic image bearing member and part of the toner is returned from the image area to the toner carrier. Each time the time periods $t_1$ and $t_2$ are so repeated, the toner transition and back transition occur between the toner carrier and the non-image area. Since the relation between the applied voltages $V_{min}$ and $V_{max}$ and the image area potential $V_D$ is set to $$|V_{max} - V_D| < |V_D V_{min}| \qquad (2),$$

the amount of toner transition from the toner carrier to the image area is much greater than the amount of toner back transition in the first process and therefore, it practically offers no problem that the toner back transition reduces the toner transition, namely, the effect of development.

Subsequently, when the amplitude of the applied voltage is continuously or intermittently attenuated to a predetermined value of $$V_{max} = V_D + |Vth \cdot r| \qquad (3)$$

as shown by (2) in FIG. 2 A, the amount of back transition of the toner to the toner carrier from the electrostatic image bearing member to which the toner have once adhered in the time period $t_2$ becomes substantially zero. $|Vth \cdot r|$ is the minimum absolute potential difference between the electrostatic image formation surface and the toner carrier surface at which the toner can be separated from the electrostatic image formation surface and can effect back transition to the toner carrier.

Further, when $$V_{max} < V_D + |Vth \cdot r| \qquad (4)$$

is reached, the back transition occurs no longer and instead, there is produced an electric field which expedites the toner transition from the toner carrier to the electrostatic image bearing member, although this toner transition is smaller in amount than the toner transition during the time period $t_1$.

Accordingly, when the applied voltage is attenuated to satisfy the relation that $$V_{max} \leq V_D |Vth \cdot r| \tag{5}$$

this process is called the second process in the image area. Such phenomenon in the image area progresses to termination while becoming smaller in amount until the alternating component of the applied voltage becomes null and is converged to a predetermined DC value, whereupon the phenomenon reaches the state of (3).

The process of toner movement in the non-image area (potential $V_L$) of the electrostatic image bearing member will now be described by reference to FIG. 2 C. In the first process shown as (1), $V_{max} > V_L > V_{min}$ and so, during the time period $t_1$ (applied voltage is $V_{min}$), a relatively weak toner transition field occurs from the toner carrier to the non-image area of the electrostatic image bearing member and the toner adheres to the non-image area. On the other hand, during the time period $t_2$ (applied voltage is $V_{max}$), a relatively strong toner back transition field occurs from the non-image area toward the toner carrier and the toner is returned from the non-image area to the toner carrier. Each time the time periods $t_1$ and $t_2$ are so repeated, the toner transition and back transition occurs between the non-image area and the toner carrier and the toner is considered to effect reciprocal movement therebetween. It is considered that the amount of toner back transition becomes greater in probability than the amount of toner transition because the relation between the applied voltages $V_{min}$ and $V_{max}$ and the non-image area potential $V_L$ is set to $$|V_{max} - V_L| > |V_L - V_{min}| \tag{6}$$

Of course, in this case, no more than the toner having adhered actually effects the back transition.

Next, when the amplitude of the applied bias voltage is continuously or intermittently attenuated to a predetermined value of $$V_{min} = V_L - |Vth \cdot f| \tag{7}$$

as shown by (2) in FIG. 2 A, the amount of toner transiting from the toner carrier to the electrostatic image bearing member during the time period $t_1$ becomes substantially zero. $|Vth \cdot f|$ is the minimum absolute potential difference between the electrostatic image formation surface and the toner carrier at which the toner can be separated from the toner carrier surface and can transit to the electrostatic image formation surface. This value is varied with the conditions of the developer and development.

Further, when $$V_{min} > V_L - |Vth \cdot f| \tag{8}$$

is reached, such transition occurs no longer and instead, there is produced an electric field which expedites the tendency of the toner to back-transit from the electrostatic image bearing member toward the toner carrier, although such back-transition is smaller in amount than the toner back transition during the time period $t_2$.

Accordingly, when the applied voltage is attenuated (in this case, $V_{min}$ is greater) to satisfy the relation that $$V_{min} \geq V_L - |Vth \cdot f| \tag{9},$$

this process is called the second process in the non-image area. Such phenomenon in the non-image area progresses to termination while becoming smaller in amount until the alternating component of the applied voltage becomes null and is converged to a predetermined DC value.

In other words, the fog or the phenomenon of contact of the toner with the non-image area takes place in the first process, but it is eliminated in the second process.

FIG. 2 D shows a modification of the application of the bias voltage shown in FIG. 2 A, and FIGS. 2 E and F represent the mode of toner transition or toner back transition with respect to the image area and the non-image area in that case. The application of the bias voltage in the case of FIG. 2 D satisfies $V_{min} < V_L < V_{max}$ and has added thereto the condition of $V_{max} < V_D + |Vth \cdot r|$. In the case of such bias voltage application, as compared with the case of the bias voltage application shown in FIG. 2 A, there is no phenomenon of toner back transition in the image area and the phenomenon in the non-image area does not substantially greatly differs from the state shown in FIG. 2 C. As shown in FIG. 2 E, there is no back transition of the toner in the first process (1) and this holds true with the second process (2). In this case, the boundary between the first and the second process is the time when $V_{min} = V_L - |Vth \cdot f|$ and it is considered that the second process is entered when $V_{min}$ becomes greater than that.

Description has hitherto been simply made of the extreme cases of the image area (dark area) and the non-image area (light area), but as regards the half-tone, the amount of final toner transition to the electrostatic image surface is determined by the magnitudes of the amounts of toner transition and toner back transition corresponding to the potential of the half-tone area. Therefore, the curve of the amount of toner transition for the electrostatic image potential is smaller in gradient than the curve 1 as shown by curve 3 in FIG. 1 and becomes substantially uniformly varied from the non-image area potential $V_L$ to the image area potential $V_D$. By this, there is obtained a visible image having a good tone reproduction from the light area to the dark area, including the half-tone of the image. In the first process in the above-described first method, it is essential to make such a design that the electric field alternates in the non-image area, whereby the tone once adheres to the non-image area as well, and this leads to the possibility of the toner positively adhering also to the half-tone image area having a density adjacent to the non-image area, which in turn leads to an advantage that a visible image having a good tone reproduction of such half-tone area may be obtained by effecting the strip-off (back transition) of the once deposited toner in accordance with the non-image area potential.

Figure 3A:
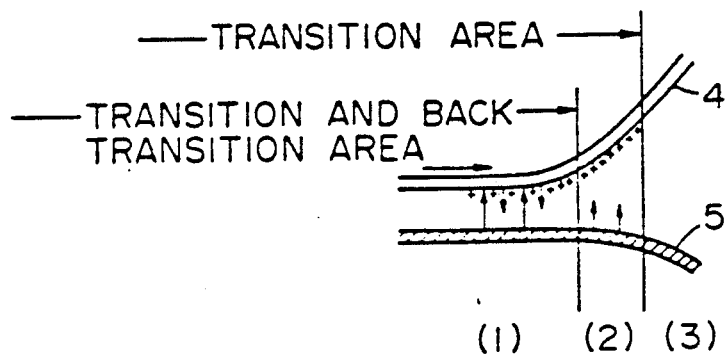
Figure 3B:
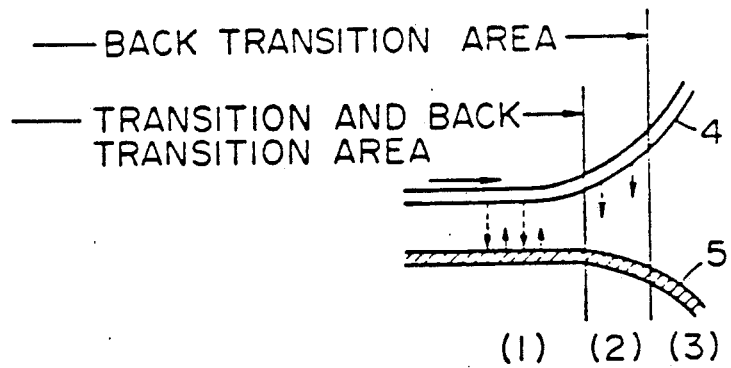

An example of the developing process in the second method is shown in FIGS. 3 A and B. As shown in FIGS. 3 A and B, the electrostatic image bearing member 4 moves in the direction of arrow and passes through the developing areas (1) and (2) to the area (3). Designated by 5 is the toner carrier. FIG. 3 A shows the toner transition and back transition fields from the toner carrier 5 in the image area of the electrostatic image bearing member and FIG. 3 B shows the toner transition and back transition fields from the carrier in the non-image area. In these figures, solid-line arrows indicate the toner transition field and broken-line arrows indicate the toner back transition field. The direction of the arrows indicates the directions of the electric fields and the length of the arrows indicates the intensity of the electric fields. This second method, as will hereinafter be described, is directed chiefly to increasing the developing clearance and thus decreasing the intensity of the electric field rather than attenuating the voltage itself.

As shown in FIG. 1, $V_{max}$ and $V_{min}$ as the bias voltage are repetitively applied at time intervals $t_1$ and $t_2$, and of course, the waveforms of the applied voltages are not restricted to those shown. As already described, the condition of $V_{max} > V_L > V_{min}$ is given as a premise and the conditions that $|V_{max} - V_L| > |V_L - V_{min}|$ and $|V_{max} - V_D| < |V_D - V_{min}|$ are set.

By doing so, in the image area, both the toner transition and the toner back transition alternately occur in the developing area (1), as shown in FIG. 3 A. This development has been described in detail by reference to FIG. 2 B. Accordingly, in this developing area (1) wherein the developing clearance is small, the first process of development occurs. Next, when the developing area (2) in which the developing clearance is larger is entered, the already described second process occurs. In this developing area (2), the developing clearance is wider so that the electric field becomes weaker in inverse proportion to the widening of the clearance even if there is no variation in the value of the applied voltage, and the back transition field becomes lower than the threshold value $|Vth \cdot r|$ necessary for the back transition and thus, the toner transition is possible but the toner back transition cannot take place. Accordingly, the boundary between (1) and (2) corresponds to the time when $V_{max} = V_D + Vth \cdot r$ if it is made to correspond to the case where the clearance is constant while the applied voltage is varied. When the developing area (3) is entered, the clearance becomes so wide that neither of the toner transition and the back transition takes place any longer and the development is terminated thereat.

In the case of the non-image area shown in FIG. 3 B, the areas (1) and (2) correspond to the first and the second process, respectively. In the area (1), both the transition and the back transition of toner occur as previously described with respect to FIG. 2 C. Thus, fog takes place in this area. When the area (2) is entered, the intensities of the electric fields resulting from the voltages of $V_{max}$ and $V_{min}$ both become weaker in inverse proportion to the widening of the developing clearance and the back transition of the toner is possible but no transition field which will cause the transition of the toner is produced. Accordingly, the fog is fully eliminated in this area (2).

Subsequently, when the developing area (3) is entered, neither the transition nor the back transition of the toner occurs any longer and the development is terminated.

Thus, again by this method, there is obtained an effect substantially equal to the effect of varying the applied bias voltage and not only the fog can be eliminated but also, as regards the half-tone, the final amount of toner transition to the electrostatic image bearing member is determined by the magnitudes of the toner transition and back transition corresponding to the surface potential of the half-tone image, with a result that the curve of the electrostatic image potential versus toner transition amount becomes one having a good tone reproduction as shown by curve 3 in FIG. 1.

The conditions that $|V_{max} - V_L| > |V_L - V_{min}|$ and $|V_{max} - V_D| < |V_D - V_{min}|$ when the image area charge is positive become $|V_{min} - V_L| > |V_L - V_{max}|$ and $|V_{min} - V_D| < |V_D - V_{max}|$ when the image area charge is negative.

As hitherto described, the application of an extraneous alternate voltage between the electrostatic image formation surface and the toner carrier remarkably improves the tone gradation of the resultant image, and it is possible to further improve the reproducibility of line images as well by selecting the amplitude and frequency of the extraneous alternate image to suitable magnitudes as will hereinafter be described.

Figure 4:
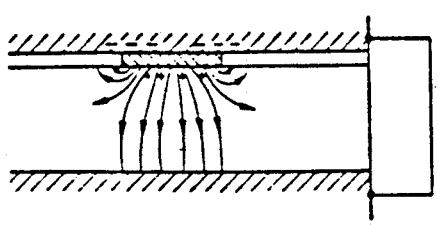
FIG. 4 illustrates the electric line of force produced from the electrostatic image in the developing method according to the prior art.

Description will hereinafter be made with the electrostatic image formation charge as being positive. In the toner transfer development, as shown in FIG. 4, the electric line of force emanating from the latent image edges goes around the back electrode of the latent image formation surface and cannot reach the toner layer, thus tending to result in thinned line or poor sharpness of the edges of the image during the development.

Figure 5:
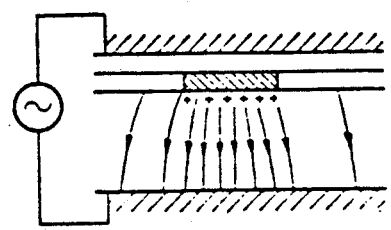
FIG. 5 illustrates the electric line of force produced from the electrostatic image in the developing method according to the present invention.

On the other hand, when the alternating wave as shown in FIG. 1 is applied and when the minimum value $V_{min}$ of the applied voltage is lower than the latent image light area potential $V_L$ as shown in this figure, the electric line of force in the developing area at the development expediting stage becomes such as shown in FIG. 5. That is, the electric line of force goes less around the edges of the latent image and parallel electric fields are formed in the developing area. Thus, even the edges are developed clearly.

To enhance the reproducibility of the edges of the image in this manner, it is preferable to select the development expediting bias ($V_{min}$) to a sufficiently low value (in case of a positive electrostatic image), but too low a value for such bias would result in excessive developer adhering to the non-image area in the toner transition stage and even if the back transition bias is increased to strip off such excessive toner, the resultant image will be poor in contrast, after all.

On the other hand, in order that the toner may be separated from one of the toner carrier and the electrostatic image formation surface and transit to the other, there must be a threshold of a certain finite potential difference between the two. As such threshold value, there is $|Vth \cdot f|$ when the toner transition occurs from the toner carrier to the latent image formation surface as previously described, and there is $|Vth \cdot r|$ when the toner back transition occurs from the latent image formation surface to the toner carrier. In order to increase the reproducibility of line image while avoiding the adherence of excessive developer to the non-image area in the toner transition stage, $|Vth \cdot f|$ may be selected to a sufficiently great value and the development expediting bias ($V_{min}$) may be decreased. The proper value thereof substantially lies in the range $$V_L - 2|Vth \cdot f| < V_{min} < V_L \qquad (10),$$

and most preferably lies in $$V_{min} \approx V_L - |Vth \cdot f| \qquad (11).$$

If $V_{min}$ is below $V_L - 2|Vth \cdot f|$, the fog in the non-image area will be unavoidable.

If, in a preferred embodiment of the developing method according to the present invention, magnetic toner is used as the developer and a non-magnetic sleeve enclosing a magnet therein is used as the toner carrier, it has become apparent that there may be obtained images which are clear at the edges of the images and excellent in half-tone reproduction. An advantage of using the magnetic toner lies in that by suitably setting the magnetism of the toner and the magnetic force of the toner carrier, the binding force of the toner to the toner carrier is enhanced and accordingly, $|Vth \cdot f|$ becomes greater with a result that the $V_{min}$ of the extraneous alternate field can be selected to a sufficiently low value. Further, the proper value of $V_{max}$ corresponding to the proper value $V_L - 2|Vth \cdot f| V_{min} < V_L$ is $$V_D < V_{max} < V_D + 2|Vth \cdot r| \quad (12)$$

It has become clear that these values enhance the effect of improving the reproducibility to the greatest degree by a minimum alternate voltage value. To cause the toner to fly through the developing clearance and temporally reach the non-image area as well to thereby improve the tone reproduction and then to cause the toner to be stripped off chiefly from the non-image area, it is necessary to properly select the amplitude and alternating frequency of the applied alternate bias voltage. The results of the experiment in which the effect of the present invention has clearly appeared due to such selection will be shown below.

Figure 6A:
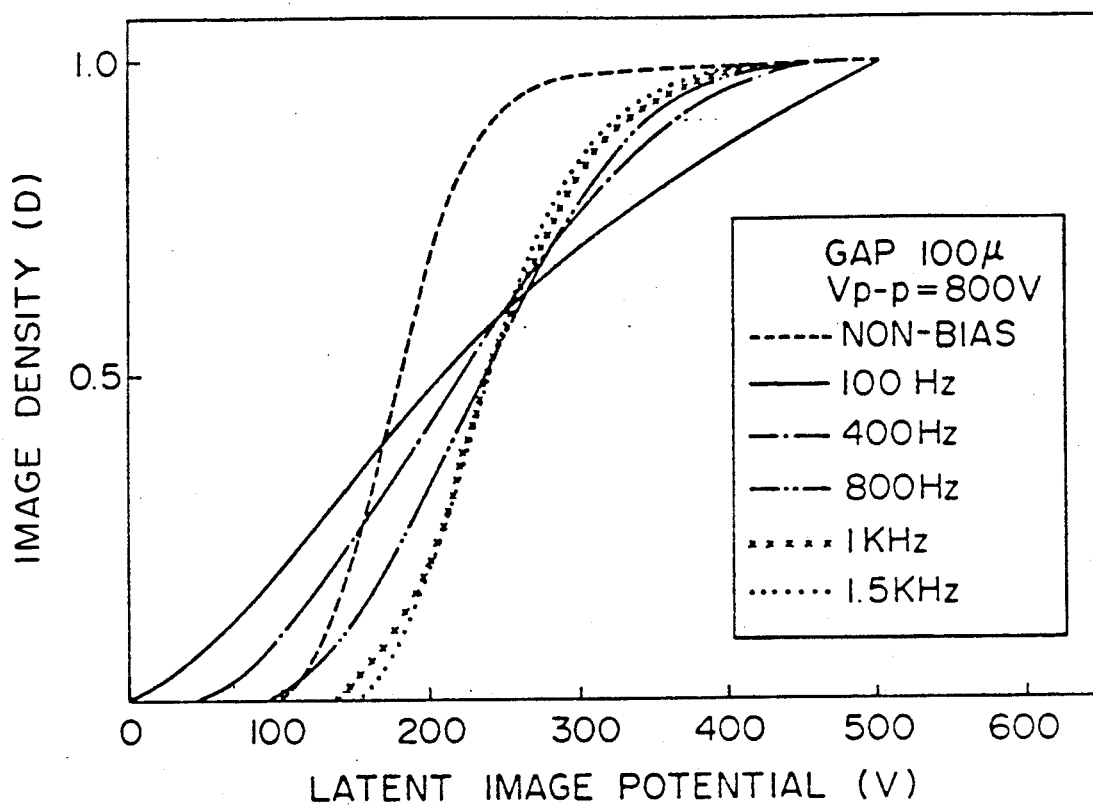
FIGS. 6 A and B show the characteristic of the electrostatic image potential versus image density as the result of the experiment effected on the developing method according to the present invention, with the frequency of the applied alternating electric field varied.
Figure 6B:
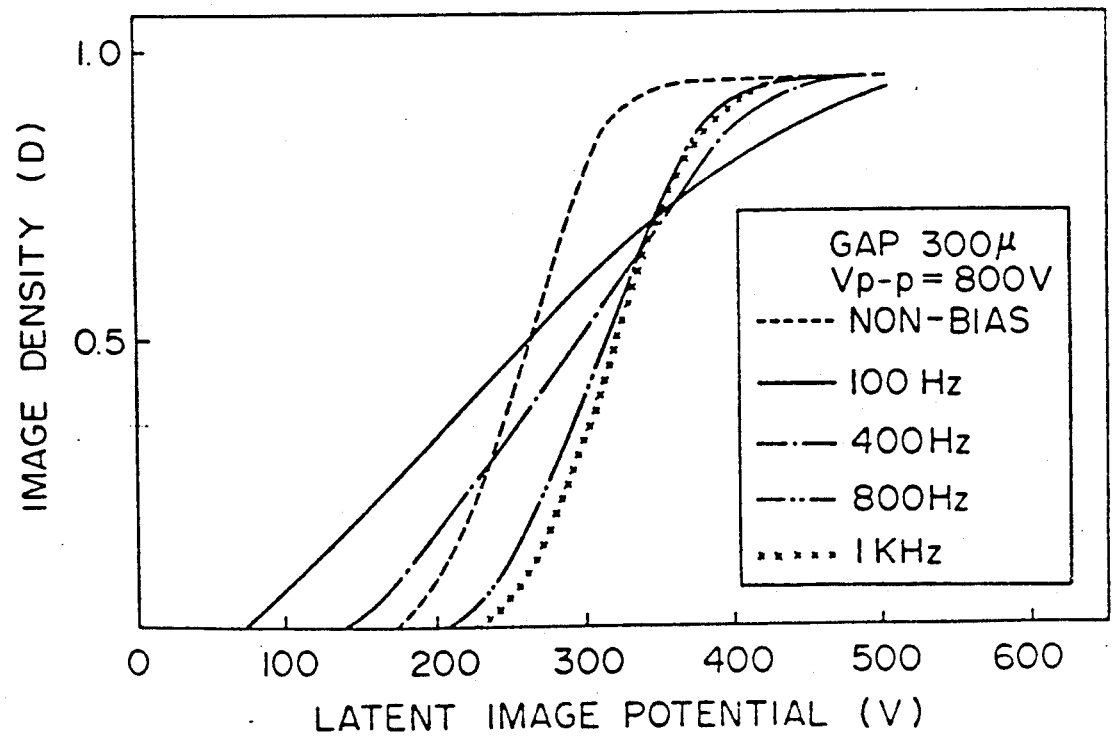

FIGS. 6 A and B show the plotted results of an experiment in which the image reflection density (D) for the electrostatic image potential (V) is measured with the amplitude of the applied alternate voltage fixed and with the frequency thereof varied. These curves will hereinafter be referred to as the V-D curves. This experiment was carried out under the following construction. A positive electrostatic charge latent image is formed on a cylindrical electrostatic image formation surface. The toner used is a magnetic toner which will hereinafter be described (containing 30% magnetite). The toner is applied to a thickness of about 60μ on a non-magnetic sleeve enclosing a magnet therein, and negative charge is imparted to the toner by the friction between the toner and the sleeve surface. The result when the minimum developing clearance between the electrostatic image formation surface and the magnetic sleeve was maintained at 100μ is shown in FIG. 6 A, and the result when such clearance was maintained at 300μ is shown in FIG. 6 B. The density of the magnetic flux in the developing station resulting from the magnet enclosed in the sleeve is about 700 gausses. The cylindrical electrostatic image formation surface and the sleeve are rotated substantially at the same speed of about 110 mm/sec. in the same direction. Accordingly, the electrostatic image formation surface passes through the minimum clearance in the developing station, and then gradually goes away from the toner carrier. The alternate electric field applied to this sleeve is a sine wave of amplitude $V_{p-p} = 800$ V (peak-to-peak value) with a DC voltage of +200 V superimposed thereon. FIGS. 6 A and B show the V-D curves when the alternating frequency of the applied voltage is 100 Hz, 400 Hz, 800 Hz, 1 KHz and 1.5 KHz (only in FIG. 6 A), and the V-D curves when no bias field is applied but the back electrode of the electrostatic image formation surface and the sleeve are made to conduct.

From these results, it is seen that when no bias field is applied, the gradient on the so-called $\gamma$ value of the V-D curves is very great but by an alternate electric field of low frequency being applied, the $\gamma$ value becomes very small to greatly enhance the tone gradation. As the frequency of the extraneous electric field is increased from 100 Hz, the $\gamma$ value gradually becomes greater and the effect of enhancing the tone gradation becomes poorer and in the case of a clearance of 100μ, the effect becomes very weak under the aforementioned amplitude ($V_{p-p} = 800$ V) when the frequency exceeds 1 KHz; in the case of a clearance of 300μ, if the amplitude is $V_{p-p} = 800$ V as described above, the effect is decreased when the frequency becomes 800 Hz or so, and the effect of tone reproduction becomes very weak when the frequency exceeds 1 KHz. This is considered attributable to the following reason. A finite time is necessary to ensure reciprocal movement of the toner when the toner repeats its adherence and separation in the clearance between the sleeve surface and the latent image formation surface during the developing process in which an alternating electric field is applied. Particularly, when the toner transits by being subjected to a weak electric field, it takes a long time for the toner to positively effect its transition. On the other hand, to reproduce the density of half-tone, it is necessary for the toner subjected to an electric field which is weak but greater than a certain threshold value to positively transit to the image area within one-half of the period of the alternating electric field. For that purpose, a lower frequency is more advantageous if the amplitude of the alternating electric field is constant, and thus, especially good tone reproduction may be obtained for an alternating electric field of very low frequency as represented by the results of the experiment. This speculation is justified by the comparison between the results of the experiment shown in FIGS. 6 A and B. The results shown in FIG. 6 B have been obtained under the same conditions as those shown in FIG. 6 A except that the clearance between the electrostatic image formation surface and the sleeve surface is as great as 300μ. The wider clearance results in a lower intensity of the electric field to which the toner is subjected, and consequently a lower velocity of transition of the toner. The wider clearance further results in a longer distance of jump and after all, a longer time of transition. As is actually apparent from FIG. 6 B, the $\gamma$ value becomes considerably great for the order of 800 Hz and, when 1 KHz is exceeded, the $\gamma$ value becomes almost equal to that when no alternate voltage is applied. Therefore, in order to obtain the same effect of enhanced tone reproduction as that when the clearance is narrow, it is preferable to reduce the frequency or to increase the intensity (amplitude) of the alternating voltage as will later be described.

On the other hand, too low a frequency would not result in sufficient repetition of the reciprocating movement of the toner during the time the latent image formation surface passes through the developing station, and tends to cause irregular development to be created in the image by the alternating voltage. As the result of the foregoing experiment, generally good images have been provided down to the frequency of 40 Hz, and when the frequency is below 40 Hz, irregularity has been created in the visible image. It has been found that the lower limit of the frequency for which no irregularity is created in the visible image depends on the developing conditions, above all, the developing speed (also referred to as the process speed, $V_p$ mm/sec.). In the present experiment, the velocity of movement of the electrostatic image formation surface has been 110 mm/sec. and therefore, the lower limit of the frequency is $$40/110 \times V_p \approx 0.3 \times V_p \quad (13).$$

As regards the waveform of the alternating voltage applied, it has been confirmed that any of sine wave, rectangular wave, saw-tooth wave or asymmetric wave of these is effective.

Such application of an alternating bias of low frequency brings about remarkable enhancement of the tone gradation, but the voltage value thereof must be properly set. That is, too great a value for the $|V_{min}|$ of the alternating bias may result in an excessive amount of toner contacting the non-image area during the toner transition stage and this may present sufficient removal of such toner in the second process of the development, which may in turn lead to fog or stain left in the image. Also, too great a value for $|V_{max}|$ would cause a great amount of toner to be returned from the image area, thus reducing the density of the so-called solid black portion. To prevent these phenomena and to sufficiently enhance the tone gradation, $V_{max}$ and $V_{min}$ may preferably and reasonably be selected to the following degrees:

$$V_{max} \approx V_D + |V_{th \cdot r}| \quad (14)$$

$$V_{min} \approx V_L - |V_{th \cdot f}| \quad (15)$$

Vth·f and Vth·r are the potential threshold values already described. If the voltage values of the alternating bias are so selected, the excess amount of toner adhering to the non-image area in the toner transition stage and the excessive amount of toner returned from the image area in the back transition stage would be prevented to ensure obtainment of proper development result.

Figure 7A:
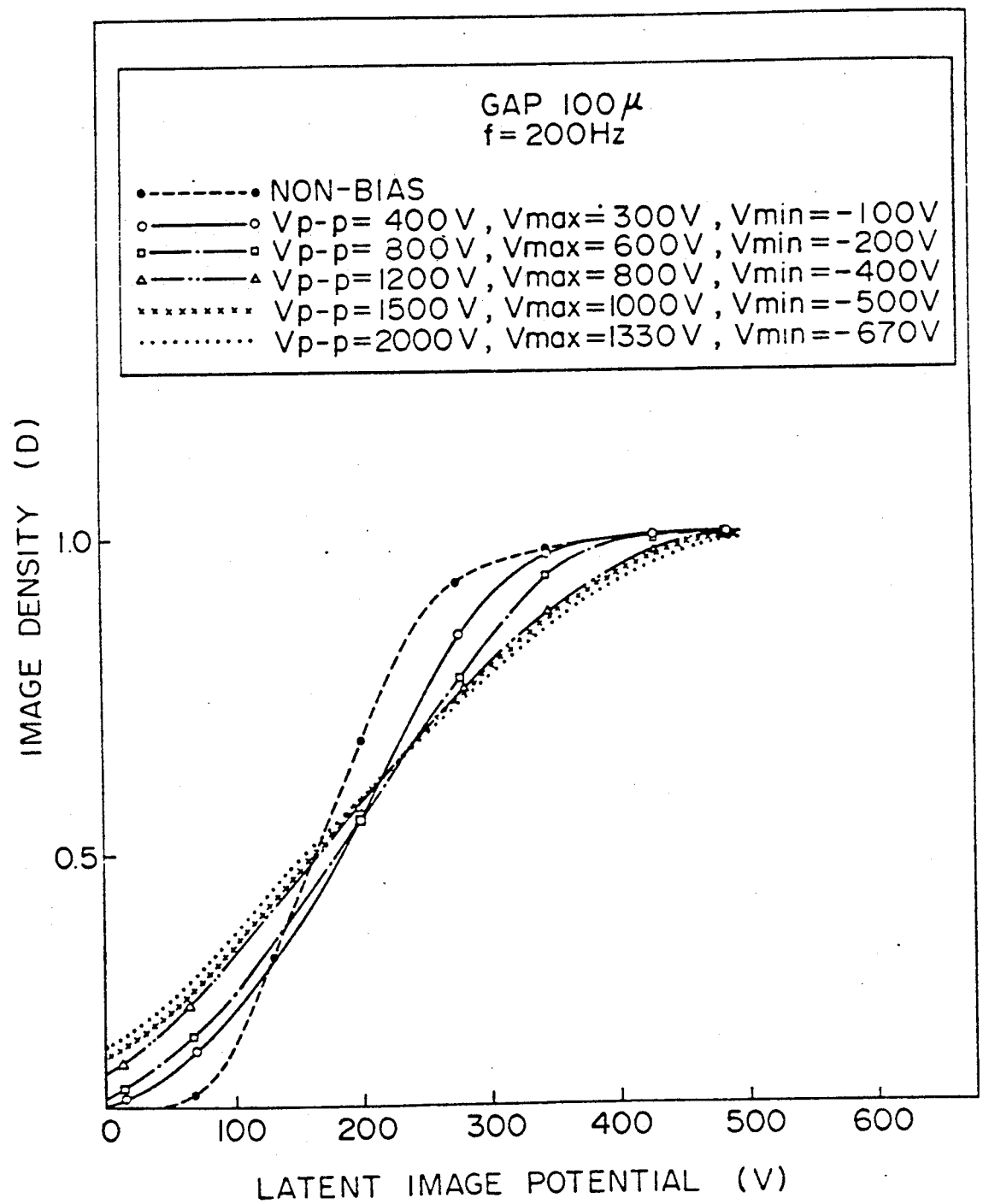
FIGS. 7 A and B show the characteristic of the electrostatic image potential versus image density as the result of the experiment effected on the developing method according to the present invention, with the amplitude of the applied alternating electric field varied.
Figure 7B:
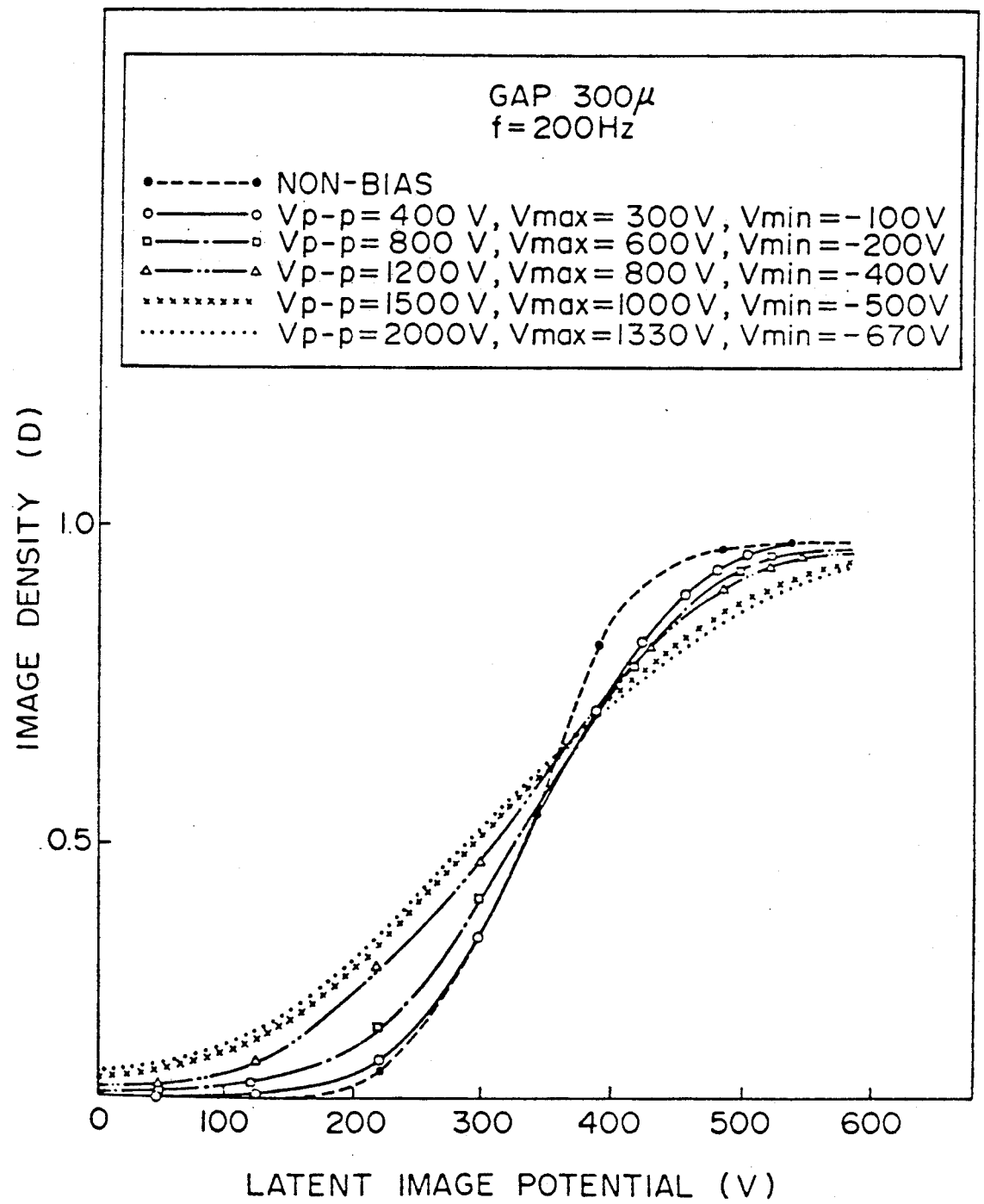

This will be shown by the results of an experiment. FIGS. 7 A and B show the V-D curves when the frequency of the alternating electric field has been fixed (200 Hz) and the amplitude $V_{p-p}$ thereof has been varied. FIG. 7 A shows the result when the developing clearance has been set to 100μ, and FIG. 7 B shows the result when the developing clearance has been set to 300μ. All the other conditions are the same as those of FIGS. 6 (A and B). When the developing clearance is relatively small, the result of enhanced tone gradation appears if the amplitude $V_{p-p}$ exceeds 400 V, as compared with the case where no electric field is applied. If the $V_{p-p}$ exceeds 1500 V, the tone reproduction is good but fog begins to appear in the non-image area, and if the $V_{p-p}$ exceeds 2000 V, much fog appears. In this case, prevention of the fog may be accomplished by making the alternating frequency higher than 200 Hz.

When the developing clearance is as wide as 300μ, an effect of improved tone reproduction has begun to appear for $V_{p-p}=400$ V or higher, and formation of good images excellent in tone reproduction and almost free of fog has become possible for the order of 800 V. When the $V_{p-p}$ exceeds 2000 V, the tone reproduction is good but fog is created and in this last case, it is necessary to increase the alternating frequency.

When the developing clearance d is thus relatively great, it is advisable that the $V_{p-p}$ of the voltage applied be greater and f be higher than when d is small.

In order to enhance the tone gradation of the image, it is necessary to set the alternating frequency and the amplitude value of the applied alternating voltage to suitable ranges, and it has been found that depending on the property of the image, it is possible to selectively change over and select the relation between the frequency and the amplitude value of the applied voltage within an appropriate range. That is, when the relation between the frequency and the voltage value of the alternating voltage is studied more strictly, it has become apparent that the developing characteristic (V-D curves) can be arbitrarily selected in accordance with the values of those. An example thereof is shown in FIG. 8.

Figure 8:
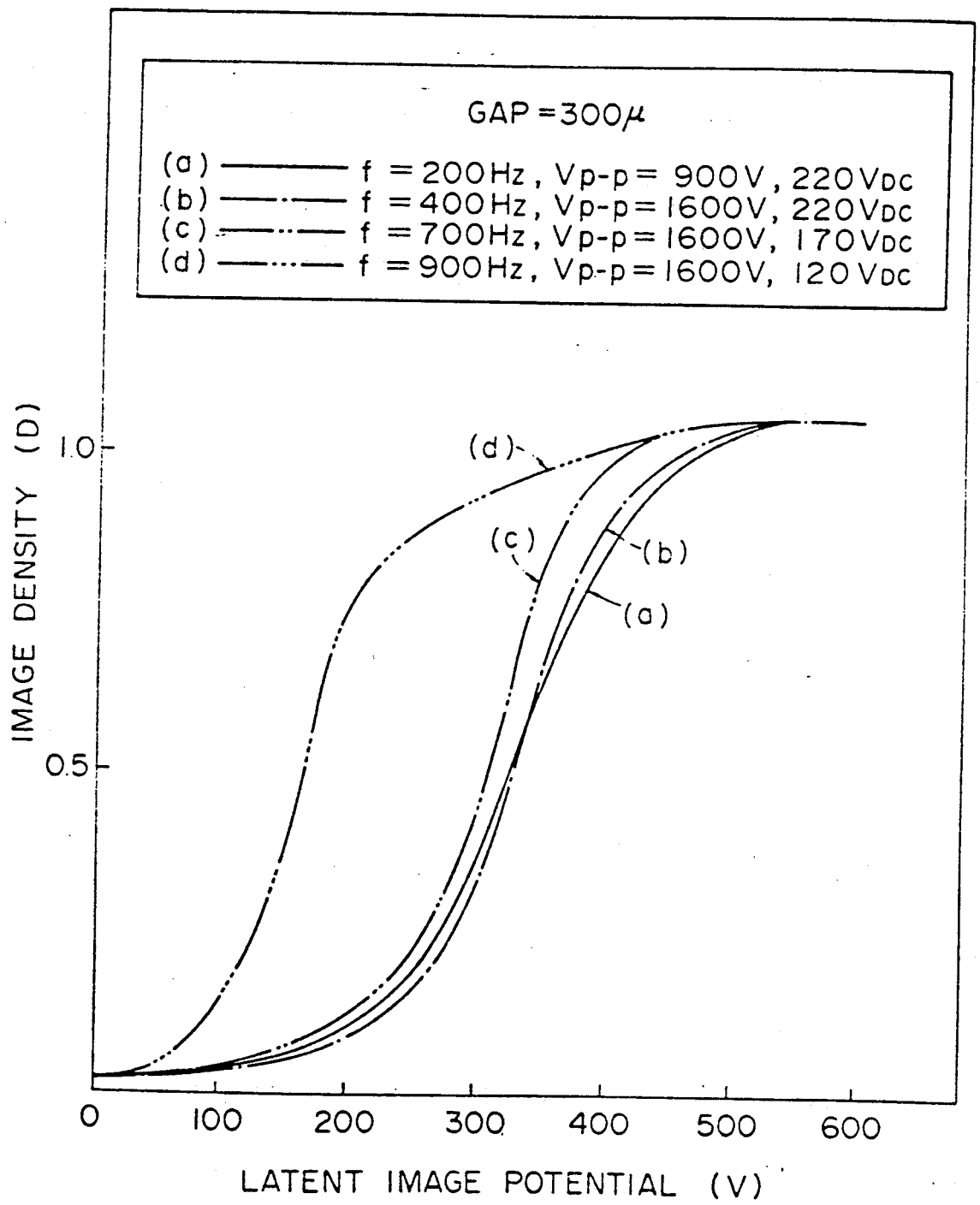
FIG. 8 shows the characteristic of the electrostatic image potential versus image density as the result of the experiment effected on the developing method according to the present invention, with the frequency and amplitude of the applied alternating voltage varied.

FIG. 8 shows the developing characteristic when the clearance between a photosensitive drum which is the latent image bearing member and a sleeve which is the developer carrier is 300μ, the thickness of the developer layer on the sleeve is about 100μ and as the toner, use is made of 100 parts of styrene acryl resin, 60 parts of ferrite, 2 parts of carbon black and 2 parts of anriferous dye as the charge control agent mixed and ground and having 0.4% by weight of colloidal silical extraneously added thereto. The conditions of each of the shown curves are the bias conditions (alternating frequency f (Hz) and amplitude value ($V_{p-p}$)) for visualizing the dark region potential (about 500 V) by the light region potential of about 0 V. The waveform of the applied voltage is a sine wave with a DC voltage superimposed thereon. (The slight difference of FIG. 8 from the previously mentioned graph is attributable to the difference of the developer used).

As is apparent from the graphs of FIGS. 6 A and B and FIG. 8, when the frequency f is low, there is usually obtained a developing characteristic having high tone gradation and when the frequency f is slightly high, there is obtained a developing characteristic having a great value for γ. By varying the amplitude of the alternate voltage in addition to such variation in frequency, it is possible to obtain any desired developing characteristic corresponding to the kind of the image. (The DC component is also varied slightly.)

The curve (a) shown in FIG. 8 is the VD curve when the frequency f is 200 Hz, $V_{p-p}=900$ V and the superimposed DC component is 220 V, and it is seen therefrom that this bias condition has a good tone gradation. The curve (b) is the VD curve when the frequency and the amplitude value have been increased to f=400 Hz and $V_{p-p}=1600$ V, respectively, with a DC component of 220 V, and it is somewhat greater in γ than the curve (a) but still has a relatively high tone gradation.

If, with respect to the curve (b), the frequency is increased to 700 Hz and 900 Hz with the amplitude $V_{p-p}$ maintained constant (the superimposed DC voltage is decreased), the γ becomes greater and greater as indicated by the curves (c) and (d), thus resulting in poor tone gradation. On the other hand, however, as shown by the curve (d), it can be seen that even if the electrostatic image potential is low, good development at that potential is possible. Further, although the tone gradation is poor, the so-called edge effect becomes great to provide good reproducibility of the line image and reduced fog.

By so varying the bias conditions, it is possible to ensure all-round quality of image corresponding to the original or to the liking of the user.

A preferable range of combination between the alternating bias conditions (frequency f (Hz) and amplitude value $V_{p-p}$(V) on the basis of each experiment is shown in FIG. 9. FIG. 9, with the ordinate representing the amplitude $V_{p-p}$ (V) of the applied voltage and the abscissa representing the alternating frequency f (Hz) thereof, shows a preferable range of combination between the two selectable in accordance with the image.

In FIG. 9, the solid-line curve P indicates the boundary of the range at which fog relatively tends to appear when the developing clearance is 300μ, and the shaded area A indicates a range in which the fog tends to appear and which is not suited for the line copy. Also, the solid-line curve q indicates the boundary at which the quality of the tone gradation is judged when the developing clearance is 300μ, and the shaded area C indicates a range in which the effect thereof is low. Thus, the range B surrounded by the two curves p and q is a range in which fog is reduced and the image is excellent in definition and tone gradation.

Of course, the positions of these curves p and q may be more or less varied by a variation in size of the developing clearance d. When d is relatively small, the curves p and q become displaced to dot-and-dash line positions p' and q', respectively.

Particularly, in the area encircled by a broken line S, the overall effect of the bias by the alternate field of low frequency is pronounced. The lower limit value of the frequency in this area S is a value determined by the previously mentioned relation that $f \geq 0.3 \times V_p$, and the upper limit value thereof is determined with a view to well maintain the SN ratio. This SN ratio will now be described. When the frequency of the applied alternate field is increased as mentioned previously, it is necessary to make the amplitude $V_{p-p}$ of the applied voltage great in order to ensure the reciprocal movement of the developer (the movement of the developer which temporally reaches the non-image area, also) to take place between the developer carrier and the latent image bearing member. However, when such a voltage value becomes high, it is much higher than the potential difference ($V_D$) of the image area to be visualized and the transition phenomenon of the developer to the image area can hardly sense the potential difference $V_D$. If so, the definition of the image becomes reduced so that the line reproducibility becomes poor and the fog becomes ready to appear. In addition, the use of a high voltage (higher than about 2500 V) in particular tends to cause the discharging phenomenon with respect to neighboring members and this leads to a problem in constructing an apparatus.

Therefore, under the above-described standard set conditions, the amplitude may preferably be $V_{p-p} \leq 2500$ V, and particularly preferably be $V_{p-p} \leq 2000$ V, and the frequency may particularly preferably be $f \leq 1$ KHz. Depending on the combination with the amplitude, the frequency may practically be $f \leq 1.5$ KHz to thereby obtain the intended effect.

As has hitherto been described, the application of an extraneous alternating voltage between the latent image formation surface and the toner carrier leads to remarkably enhanced tone gradation of the image and preventing of fog. Further, by using magnetic toner as the developer and a sleeve enclosing a permanent magnet as the developer carrier and by properly setting the extraneous alternating voltage value, as will hereinafter be described, it is possible to further enhance the reproducibility of line images at the same time.

Description will hereinafter be made with the electrostatic image formation charge as being positive, whereas the invention is not restricted thereto. In the so-called toner transfer developing method, the electric line of force produced from the end of the latent image goes around the back electrode of the latent image formation surface as shown in FIG. 4 and cannot reach the surface of the toner carrier, and accordingly the toner which has started from the toner carrier can hardly adhere to the end of the image. Thus, the resultant image tends to suffer from thinning of lines and poor sharpness of the end, which in turn offers a problem in line copying.

Therefore, in this system, if an alternating bias is applied and if the $V_{min}$ thereof is selected to a sufficiently low value, the electric line of force in the developing station during the toner transition stage goes so little around the end of the electrostatic image, as shown in FIG. 5, that there are formed parallel electric fields. This enables the toner to positively adhere to the end of the electrostatic image. However, as already noted, too low a value for $V_{min}$ would usually cause fog or stain to be created in the non-image area.

In the present embodiment of the invention, the advantage resulting from the use of the magnetic toner as the developer and the sleeve enclosing the permanent magnet as the developer carrier lies chiefly in solving this problem. By properly setting the content of the magnetic material in the developer and the intensity of the magnetic field of the permanent magnet, it is possible to uniformly enhance the restraining force of the toner onto the sleeve and accordingly select the value of $|V_{th} \cdot f|$ to a sufficiently great value. As the result, $V_{min}$ can be set to a low value with the amount of the toner adhering to the non-image area during the toner transition stage being minimized.

Thus, by applying an alternating bias in the toner transfer developing method using magnetic toner, it is possible to obtain images of good tone gradation which are clear at the end and free of fog and which are excellent also in line copying.

On the other hand, it is a very difficult problem to convey the developer to the developing station in the high resistance toner transfer development and to impart a charge. The method using magnetic toner as the developer and conveying the developer by means of a sleeve and imparting a charge by frictional charging between the sleeve surface or an applicator member and the toner is considered to be one of very advantageous methods.

Also, application of the magnetic toner onto the sleeve may be effected by a method of urging a resilient member against the sleeve or a method of maintaining a magnetic member in opposed relationship with the magnetic pole of the permanent magnet within the sleeve and in non-contact with the sleeve surface and controlling the thickness of the magnetic toner by the magnetic force. In the conventional toner transfer development wherein development is effected with the sleeve opposed to the electrostatic image bearing member and with these members being rotated in the same direction and at the same velocity, the state of the toner applied onto the sleeve directly affects the quality of image and when the application of the toner is effected by the former method, the status of application is relatively delicate and ensures a good quality of image. In this method of application, however, the toner strongly rubs against the sleeve surface and therefore the resin content of the toner adheres to the sleeve surface to remarkably prevent the toner from being charged.

On the other hand, if the latter method is used, the adherence of the toner to the sleeve surface is minimized but the status of the toner applied onto the sleeve surface presents scattered lumps of toner particles and is coarse and accordingly, the image after developed becomes coarse.

In contrast, by applying an alternating bias in the developing station according to the present invention, toner particles are caused to effect reciprocal movement between the latent image and the sleeve surface and are separated into individual particles in that process, so that the toner can finely adhere to the image area of the electrostatic image surface.

Some specific examples will be shown below in detail.

EXAMPLE 1

Figure 10A:
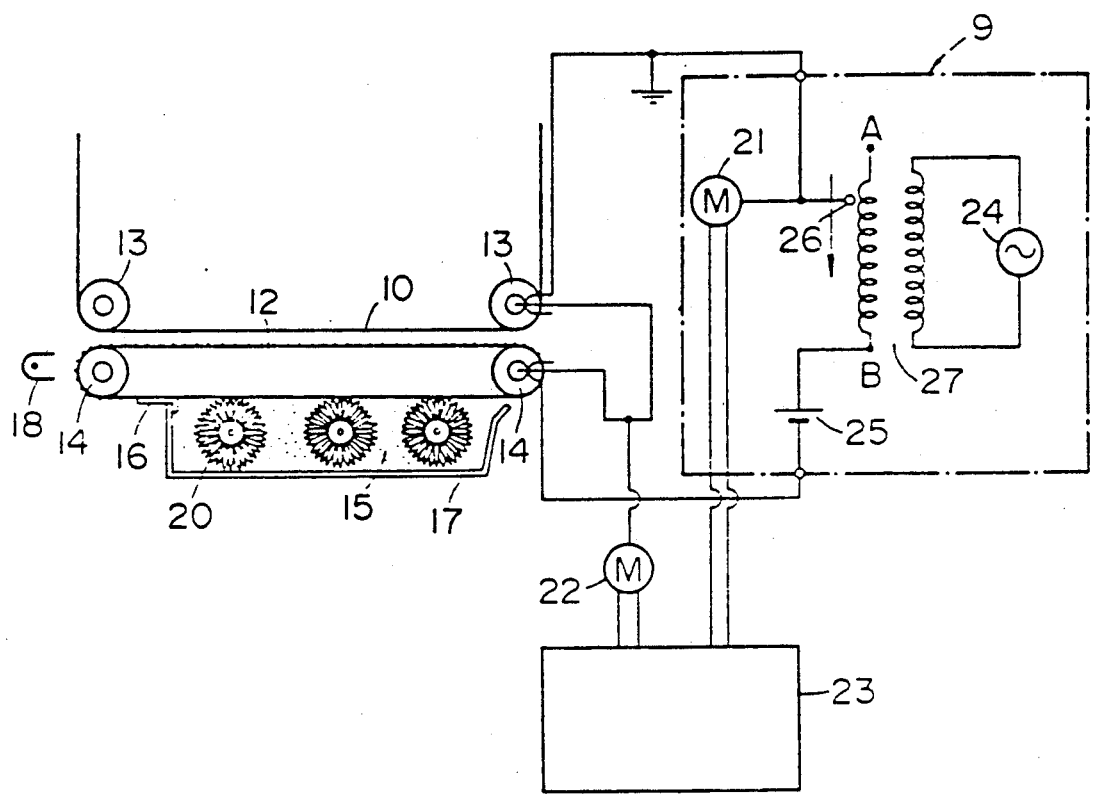
FIGS. 10 A, 10 B, 11, 12, 13 A and 14 A illustrate the developing method according to the present invention and embodiments of the apparatus therefor.
Figure 10B:
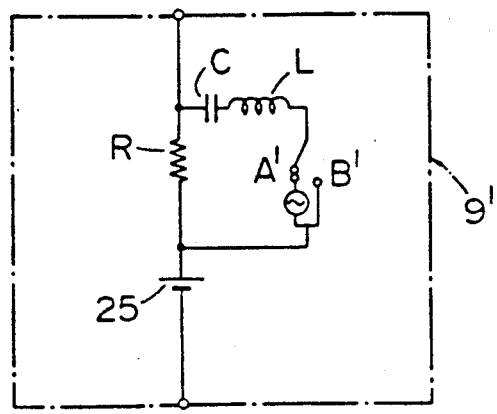

The example shown in FIG. 10 A is of a construction in which the applied bias alternate voltage is attenuated, and shows a mode in which a source voltage comprising an AC voltage of low frequency with a DC component superimposed thereon is attenuated by the use of a mechanical sliding electrode. FIG. 10 B shows a modified portion for attenuating the voltage by the use of an electric circuit.

In FIG. 10 A, reference numeral 10 designates ZnO photosensitive paper which has formed thereon an electrostatic image at another station, not shown. The paper 10 is conveyed to the shown developing station by a pair of rollers 13,13 and stopped there for development, and then again conveyed for fixation. Designated by 12 is a toner carrier comprising an electrically conductive rubber belt and driven by a pair of metal rollers 14,14. The ZnO photosensitive paper 10 as the electrostatic image bearing member and the toner carrier 12 are transported to the developing station by the rollers 13 and 14 being intermittently driven by motors 21 and 22, and become stationary during the developing process, and shift before the next developing cycle is started. The toner carrier effect one-half of a full rotation and is stopped again. Denoted by 15 is an insulating toner contained in a container 7 and it comprises styrene resin, 3% carbon black and 2% positive polarity charge control agent, all by weight. Also, to improve the fluidity, 0.2% by weight of colloidal silica is extraneously added. The toner is conveyed by the toner carrier 12, and the thickness of the toner applied is controlled to 100 to 200$\mu$ by a member 16 slidably contacting the carrier 12, and positive charge is imparted to the toner by a corona charger 18 before development is started. The clearance between the electrostatic image bearing 10 and the toner carrier 12 is maintained at 500$\mu$. Designated by 14a is a slidable electrode which is in contact with the core of the rotary roller 12, and which applies an alternating voltage to the toner carrier 12 from a power source 9. Denoted by 20 is a fur brush for stirring the developer to supply it to the toner carrier 12.

The dark region potential of the electrostatic image formed on the electrostatic image bearing member 10 was −450 V and the light region potential of such image was −40 V. The voltage applied comprised an AC voltage 1200 $V_{pp}$ of frequency ranging from 10-1000 Hz, with a DC voltage of −200 V superimposed thereon, and only the AC voltage is attenuated to 0 at a time constant of about 0.5 in 0.2 second after the start of the development.

Description will now be made of the construction of the power source 9 for causing such attenuation. Reference numeral 21 designates a motor for moving the sliding electrode 26 on the secondary winding side of an AC transformer 27. Reference numeral 24 designates an AC power source, and 25 a DC power source. Designated by 23 is a power source for driving a timing signal generating circuit and motors 21, 22.

In 0.2 second after the start of the development, the sliding electrode 26 moves from its position A to its position B at a uniform velocity after 0.5 second. Upon displacement of the sliding electrode 26 to its position B, the motor 22 is driven to cause the toner carrier 12 to effect one-half of a full rotation and during this time, the sliding electrode returns to its position A.

FIG. 10 B shows a power source 9' using a well-known RLC attenuating circuit instead of using a sliding electrode. In 0.2 second after the start of the development, the switch is changed over from its position A' to its position B'. The time constant of this attenuating circuit is set to 0.5 sec. The change-over of the switch can be accomplished in a timing fashion by known means such as a relay or the like.

Thus, the development by the previously described first method can be applied and the resultant image is substantially free of fog and excellent in tone gradation particularly in an area wherein the alternating frequency f of the applied alternating voltage is low, and especially good images have been obtained for f≦1000 Hz.

EXAMPLE 2

This example realizes the previously described second method which effects development by varying the developing clearance in accordance with the developing process, and will be described by reference to FIG. 11. Designated by 31 is an Se photosensitive belt having formed thereon an electrostatic image at another station, not shown, and developed at the shown station, and the image thereon is fixed or transferred at a further station, not shown. Reference character 32 is a toner carrier comprising an electrically conductive rubber belt, and driven by a metal roller 33. Denoted by 35 is an insulating toner contained in a container 37 and comprising polyester resin, 2% by weight of carbon black and 2% by weight of negative polarity charge control agent. To improve the fluidity of the toner, 0.1% by weight of colloidal silica is extraneously added. The toner is conveyed by the toner carrier 32 and the thickness of the toner on the toner carrier is controlled to 50-150$\mu$ by a resilient member 36 urged against the roller 33. Before the development is started, negative charge is imparted to the toner by a corona charger 38. The electrostatic image bearing member 31 is held in the developing station with a minimum clearance of 300$\mu$ with respect to the toner carrier 32 by a metal roller 41. At a point spaced apart about 30 mm from that position, the distance between the members 31 and 32 is maintained at about 2 mm by a metal roller 42 (adjustable). Designated by 43 is a driving member for adjusting the position of the metal roller 41. The members 31 and 32 are so configured that they pass through the most proximate position and then gradually widen the clearance therebetween. The members 31 and 32 move in the same direction at the same speed of 200 mm/sec.

Designated by 39 is an alternating voltage application source.

The image area potential and the non-image area potential of the electrostatic image formed on the member 31 are 800 V and 200 V, respectively. The applied voltage is an alternating current 1000 $V_{p-p}$ of frequency 200 Hz with a DC voltage of 400 V superimposed thereon. Thus, there have been obtained fogless good images which are of high tone gradation.

EXAMPLE 3

Referring to FIG. 12, reference numeral 51 designates a photosensitive drum having an Se film, and 52 denotes a toner carrier comprising an electrically conductive rubber sheet and driven by a metal roller 53. The movement velocity of the toner carrier 52 is substantially equal to the peripheral velocity of the electrostatic image bearing member 51, and it is 200 mm/sec. Designated by 45 is a non-magnetic insulating toner contained in a container 47, and it is conveyed by the friction force between the toner and the toner carrier 52 and by Van der Waals force. The thickness of the toner on the toner carrier is controlled to about 60μ by a resilient applicator member 46, and negative charge is imparted to the toner by a corona charger 48 before the development is started. The clearance between the members 51 and 52 is maintained at a minimum of 400μ, but this clearance becomes gradually larger with the rotation of the members 51 and 52, to thereby form a developing area having the previously described first and second processes. Denoted by 44 is a sliding electrode contacting the core of a rotatable member 53. The electrode 44 applies an alternating voltage to the members 52, 53 and 44 by a power source 49 with respect to the electrically conductive support member for the grounded member 51. The frequency of the alternating electric field is 100 Hz, and the electrostatic image potential is +700 V for the image area and +50 V for the non-image area, and the potential of the member 42 is $V_{max}$ = +750 V for the maximum value and $V_{min}$ = −50 V for the minimum value.

Under the above-described construction, there have been obtained clear images of high tone reproduction.

EXAMPLE 4

Referring to FIG. 13 A, reference character 61 designates a photosensitive drum having a radius of 40 mm and having a CdS layer and an insulating layer. Designated by 62 is a non-magnetic sleeve having a radius of 15 mm and enclosing a permanent magnet 63 therein. The members 61 and 62 are rotated at the same peripheral velocity of 100 mm/sec. in the same direction. Denoted by 65 is an insulative magnetic toner which comprises 60% by weight of styrene resin, 35% by weight of magnetite, 3% by weight of carbon black and 2% by weight of negative charge control agent. To improve the fluidity of the toner, 0.3% by weight of colloidal silica is extraneously added. The toner is conveyed by the sleeve 62, and the thickness of the toner applied onto the sleeve is controlled to about 70μ by a magnetic blade 66 disposed in proximity to the sleeve. Also, the toner is imparted negative charge by the friction charging between the toner and the sleeve 62. The clearance between the members 61 and 62 is maintained at a minimum of 200μ, but the movement velocities of and the clearance between the two members are set so as to satisfy the conditions already described with respect to FIGS. 3 A and B, with the rotation of the members 61 and 62. The members 62 and 66 are kept electrically conductive, and an alternating voltage is applied to the electrically conductive support member of the member 61 by a power source 69. The alternating voltage is a sine wave having a frequency of 200 Hz and the relation between the voltage value and the electrostatic image potential is such as shown in FIG. 13 B.

The electrostatic image potential is 500 V for the image area and 0 V for the non-image area, and is a sine wave of amplitude 400 V (800 $V_{pp}$) with a DC voltage of +200 V superimposed thereon. Under the above-described construction and by the low frequency based on the developing action fully described with respect to FIGS. 3 A and B, there have been obtained images which are high in tone gradation and clear.

EXAMPLE 5

Figure 14A:
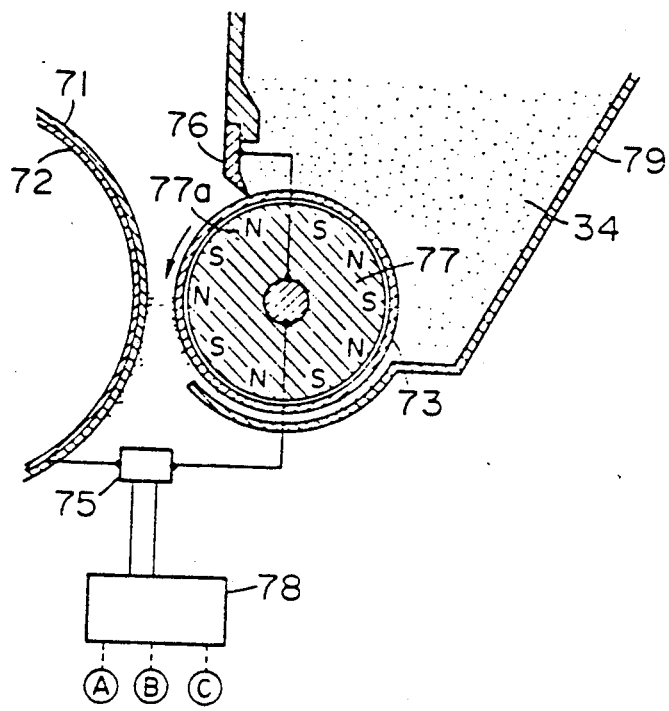
FIG. 14 B shows the output circuit of the alternating voltage applied to the embodiment shown in FIG. 14 A, and FIG. 14 C shows the output voltage waveform thereof.
Figure 14B:
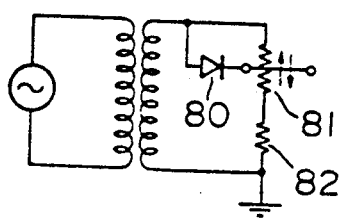
Figure 14C:
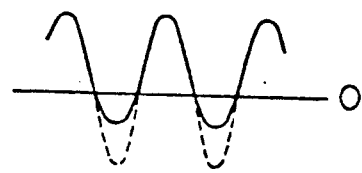

In FIG. 14 A, reference numeral 71 designates an electrostatic latent image bearing member having an insulating layer on a CdS layer. Reference numeral 72 denotes the back electrode of the member 71. The members 71 and 72 together form a drum shape. 78 designates a non-magnetic stainless sleeve having a magnet 77 therewithin. The electrostatic image bearing member 71 and the sleeve 78 have the minimum clearance therebetween maintained at 300μ by a well-known clearance maintaining means. Designated by 74 is a one-component magnetic developer contained in a developer container 79 and comprising 70% by weight of styrene maleic acid resin, 25% by weight of ferrite, 3% by weight of carbon black and 2% by weight of negative charge control agent mixed and ground and having extraneously added thereto 0.2% by weight of colloidal silica to improve the fluidity of the developer. Denoted by 76 is an iron blade opposed to the magnetic pole 77a (850 G) of the magnet roll 77 enclosed in the sleeve 73. The blade 76 controls the thickness of the magnetic developer 74 applied onto the sleeve 73 by the magnetic force. The clearance between the blade 76 and the sleeve 73 is maintained at about 240μ, and the thickness of the developer layer applied onto the sleeve 73 by the blade 76 is about 100μ. Designated by 75 is a variable alternating voltage source which is applied between the back electrode 72 and the conductive portion of the sleeve 73. Also, to prevent irregular application of the developer, the blade 76 is rendered to the same potential as the sleeve 73.

The average value of the electrostatic image potential is +500 V for the dark region potential and 0 V for the light region potential, and the extraneous alternating voltage is a sine wave of frequency 400 Hz and peak-to-peak 1500 V imparted a distortion so as to be rendered into a distorted sine wave having an amplitude ratio of 1.9:1 between the positive phase and the negative phase. Again by this embodiment, there have been obtained good visible images which are excellent in tone gradation and high in definition and free of fog.

An example of the circuit for providing such a distorted sine wave is shown in FIG. 14 B.

The circuit of FIG. 14 B generates such a distorted sine wave as shown in FIG. 14 C by reducing only the negative (−) of the sine wave AC voltage by a diode 80 and resistors 81 and 82. If the resistor 81 of the output terminal O is slidden, it is possible to make the negative (−) side voltage variable. This circuit construction leads to the greater ease with which the circuit is constructed, as compared with the superimposed DC type.

EXAMPLE 6

The power source 75 of Example 5 is modified into a plurality of voltage sources, each of which has change-over means 78 so that the frequencies and amplitude values of (a), (b) and (d) may be selected from among the four types shown in FIG. 8, for example. The change-over means 78 may be a known electrical change-over means. By operating the buttons (A)-(C) of the change-over means, the following bias conditions can be selected. (A) f=200 Hz, $V_{p-p}$=900 V (DC superimposed 220 V). At this time, the user can obtain photographic images of delicate quality in a soft tone. (B) f=400 Hz, $V_{p-p}$=1600 V (DC superimposed 220 V). This condition is used to obtain ordinary copies. (C) f=900 Hz, $V_{p-p}$=1600 V (DC superimposed 120 V). At this time, the user can reproduce originals which are so low in density as to tend to create fog or originals of colored images or originals which consist chiefly of lines, without fog and in good quality.

Of course, these selective combinations are illustrative examples and if within the aforementioned proper range, combinations of other frequencies and voltage values may be adopted.

FIGS. 15 A-15 D to FIGS. 18 A-18 C illustrate the reciprocal movement of the developer in the developing clearance under the low frequency condition applied to the developing method according to the present invention and the vibratory movement of the developer when the frequency f of the bias voltage applied is a high frequency (higher than 2 KHz). In the result of the experiment shown in FIGS. 6 A and B, a preferable range of frequency for enhancing the tone gradation has been shown, and the reciprocal movement of the developer, for example, in each of the above-described Examples, is schematically illustrated in FIGS. 15 A-D and FIGS. 17 A-D.

FIGS. 15 A-D show the movement of the developer in the clearance between the image area of the latent image bearing member 4 to be visualized and the toner carrier 5, and FIGS. 17 A-D show the movement of the developer in the clearance between the non-image area of the latent image bearing member 4 which is not to be visualized and the toner carrier 5. A in each of these Figures shows the initial state in which the bias field is not applied yet. In the toner transition stage shown in B of each Figure, more developer transits from the toner carrier 5 to the image area 4a than to the non-image area due to the electrostatic attraction. It should be noted that the developer transits to and reach the non-image area 4b as well from the toner carrier 5. Arrows indicate the direction of movement of the developer. Next, as shown in C of each Figure, in the toner back transition stage in which the electric field applied assumes the reverse phase, a relatively small amount of developer returns from the image area to the toner carrier, but since, in the non-image area, there is no charge which attracts the toner, almost all of the toner which has transited in the toner transition stage returns to the toner carrier in accordance with the reverse bias. Next, when the phase of the bias changes again, there occurs the toner transition stage as shown in D of each Figure, and thereafter such reciprocal movement of the developer is repeated as noted above. Thus, a number of reciprocal movements are effected and in the meantime, the developer is caused to once reach the non-image area as well, whereby from the half-tone image area approximate to the light region in which the potential is relatively low to the solid black image portion, there is obtained a visualizing action faithful to the potential held thereby.

On the other hand, when the alternating frequency is increased to a high frequency, for example, 2 KHz or higher, the tone gradation is reduced. This phenomenon will be described by reference to FIGS. 16 A-D and FIGS. 18 A-D. A in each of these Figures shows the states of the latent image bearing member 4 and the toner carrier 5 before the bias is applied. When the bias for toner transition is applied in the image area, the toner is liberated from the toner carrier toward the image area 4a as shown in FIG. 16 B, but the force acting on the individual toner particles causes more or less irregularity of the degree of transition and since the alternating frequency of the bias is high before such irregularity is converged, the reverse bias is applied to the toner which has reached the image area and the toner which is still suspended in the developing clearance, and it is believed that most of the suspended toner returns to the toner carrier side as shown in FIG. 16 C. Since the bias phase is reversed before this return movement is terminated, the toner is again subjected to the bias force directed toward the image area. Thus, vibration of the toner rather than reciprocal movement of the toner occurs in the clearance between the image area and the toner carrier.

Such vibratory movement of the toner is pronounced in the clearance between the non-image area in which no latent image charge is present and the toner carrier. This state as shown in FIGS. 18 A-D. From the initial state shown in FIG. 18 A, the bias phase for toner transition is applied. In this case, if a bias exceeding the transition threshold value is applied, the toner is liberated from the toner carrier but since the alternating frequency of the bias is high as shown in FIG. 18 B, the phase of the bias is reversed before the toner reaches the non-image area 4b, and the toner returns to the toner carrier (FIG. 18 C). Next, when the toner transition bias is entered, the toner is again liberated from the toner carrier, but the reverse bias is again applied during the time these toner particles are suspended in the aforementioned clearance, so that the toner particles go toward the toner carrier. Thus, the toner is vibrated in the clearance and does not substantially reach the non-image area 4a and therefore, even when the development has been terminated, the toner does not adhere the non-image area and no fog is created. On the other hand, however, the adherence of the toner to the region having a half-tone image potential approximate to the light region (the non-image area) does not sufficiently take place, thus resulting in reduced toner gradation. It is theoretically considered that this phenomenon continues to take place until a certain degree of high frequency exceeding 2 KHz is reached, and it brings about difficulties in the reproduction of tone gradation as in the present invention.

The foregoing description has been made with respect to a case where the image area potential $V_D$ is positive, whereas the invention is not restricted to such case but the invention is also applicable to a case where the image area potential is negative, and in that case, equations (2)-(12) previously mentioned may be expressed as follows:

$$|V_{min} - V_D| < |V_D - V_{max}| \qquad (2')$$

$$V_{min} = V_D - |V_{th} \cdot r| \qquad (3')$$

$$V_{min} > V_D - |Vth \cdot r| \quad (4')$$

$$V_{min} \geq V_D - |Vth \cdot r| \quad (5')$$

$$|V_{min} - V_L| > |V_L - V_{max}| \quad (6')$$

$$V_{max} = V_L + |Vth \cdot f| \quad (7')$$

$$V_{max} < V_L + |Vth \cdot f| \quad (8')$$

$$V_{max} \leq V_L + |Vth \cdot f| \quad (9')$$

$$V_L < V_{max} < V_L + 2|Vth \cdot f| \quad (10')$$

$$V_{max} \approx V_L + |Vth \cdot f| \quad (11')$$

$$V_D - 2|Vth \cdot r| < V_{min} < V_D \quad (12')$$

The present invention is not restricted to the above-described embodiments, but is applicable to the development of images formed by the electrophotographic method, the electrostatic recording method and other image formation methods.

What we claim is:

1. A method of developing an electrostatic latent image formed on an image bearing member, comprising:
   supplying to a developer carrying member a one-component developer to which silica particles are added;
   triboelectrically charging the one-component developer by friction with the developer carrying member;
   facing, at a developing position, the developer carrying member toward the image bearing member with a gap larger than a thickness of a layer of the one component developer on the developer carrying member; and
   forming an alternating electric field in the developing position to develop the electrostatic latent image.

2. A method of developing an electrostatic latent image formed on an image bearing member, comprising:
   supplying to a developer carrying member a one-component developer to which silica particles are applied;
   regulating a thickness of a layer of the one-component developer by a regulating member in contact with the developer carrying member;
   facing, at a developing position, the developer carrying member toward the image bearing member with a gap larger than the thickness of the layer of the one-component developer on the developer carrying member; and
   forming an alternating electric field in the developing position to develop the electrostatic latent image.

3. A method according to claim 2, wherein said regulating member includes an elastic member.

4. A method according to claim 2 or 3, wherein said developer is a one-component non-magnetic developer.

5. A method of developing an electrostatic latent image formed on an image bearing member, comprising:
   supplying a one-component magnetic developer, to which silica particles are added, to a non-magnetic rotatable developer carrying member;
   regulating a thickness of a layer of the one-component magnetic developer by a magnetic member disposed close to the rotatable member;
   facing, at a developing position, the developer carrying member toward the image bearing member with a gap larger than the thickness of the layer of the one-component developer on the developer carrying member; and
   forming an alternating electric field in the developing position to develop the electrostatic latent image.

6. A method of developing an electrostatic latent image formed on an image bearing member, comprising:
   supplying to a developer carrying member a dry developer to which silica particles are added;
   regulating a thickness of a layer of the developer by regulating member in contact with the developer carrying member;
   facing, at a developing position, the developer carrying member toward the image bearing member with a gap larger than the thickness of the layer of the developer on the developer carrying member; and
   forming an alternating electric field in the developing position to develop the electrostatic latent image.

7. A method of developing an electrostatic latent image formed on an image bearing member, comprising:
   supplying a dry developer containing magnetic particles, to which silica particles are added, to a non-magnetic rotatable developer carrying member containing a magnet therein;
   regulating a thickness of a layer of the developer by a magnetic member disposed close to the rotatable member;
   facing, at a developer position, the developer carrying member toward the image bearing member with a gap larger than the thickness of the layer of the developer on the developer carrying member; and
   forming an alternating electric field in the developing position to develop the electrostatic latent image.

8. A method of developing an electrostatic latent image formed on an image bearing member, comprising:
   supplying to a developer carrying member a dry developer to which silica particles are applied;
   regulating a thickness of a layer of the developer by a regulating member;
   facing, at a developing position, the developer carrying member toward the image bearing member with a gap larger than the thickness of the layer of the developer on the developer carrying member; and
   forming an alternating electric field in the developing position to develop the electrostatic latent image.

* * * * *

UNITED STATES PATENT AND TRADEMARK OFFICE
CERTIFICATE OF CORRECTION

PATENT NO. : 5,032,485

DATED : July 16, 1991

INVENTOR(S) : JUNICHIRO KANBE ET AL.

It is certified that error appears in the above-identified patent and that said Letters Patent is hereby corrected as shown below:

On the Title page, item

[57] ABSTRACT

Line 14, "ara" should read --area--.

SHEET 1 OF 14

FIG. 1, "PROBABILYTY" should read --PROBABILITY--.

COLUMN 4

Line 23, "inpart" should read --impart--.

COLUMN 6

Line 65, "alterate" should read --alternating--.

COLUMN 7

Line 26, "have" should read --has--.

COLUMN 8

Line 59, "have" should read --had--.

COLUMN 10

Line 29, "differs" should read --differ--.
Line 53, "tone" should read --toner--.

COLUMN 11

Line 43, "and" should read --nor--.

UNITED STATES PATENT AND TRADEMARK OFFICE
CERTIFICATE OF CORRECTION

PATENT NO. : 5,032,485
DATED : July 16, 1991
INVENTOR(S) : JUNICHIRO KANBE ET AL.

It is certified that error appears in the above-identified patent and that said Letters Patent is hereby corrected as shown below:

COLUMN 12

Line 12, "alterate" should read --alternating--.
Line 17, "alterate" should read --alternating--.

COLUMN 13

Line 18, "$V_L-2|Vth \cdot f|V_{min}<V_L$" should read
--$V_L-2|Vth \cdot f|<V_{min}<V_L$--.
Line 24, "alterate" should read --alternating--.
Line 37, "alterate" should read --alternating--.
Line 62, "alterate" should read --alternating--.

COLUMN 14

Line 5, "alterate" should read --alternating--.
Line 52, "alterate" should read --alternating--.

COLUMN 16

Line 27, "silical" should read --silica--.

COLUMN 17

Line 6, "value $V_{p-p}(V)$" should read --value $V_{p-p}(V))$--.
Line 30, "alterate" should read --alternating--.
LIne 36, "alterate" should read --alternating--.

UNITED STATES PATENT AND TRADEMARK OFFICE
CERTIFICATE OF CORRECTION

PATENT NO. : 5,032,485
DATED : July 16, 1991
INVENTOR(S) : JUNICHIRO KANBE ET AL.

It is certified that error appears in the above-identified patent and that said Letters Patent is hereby corrected as shown below:

COLUMN 19

Line 24, "alterate" should read --alternating--.
Line 56, "bearing" should read --bearing member--.
Line 59, "roller 12," should read --roller 14,--.

COLUMN 21

Line 14, "&" should read --a--.
Line 39, "member 42" should read --member 52--.

COLUMN 22

Line 22, "78" should read --73--.
Line 25, "sleeve 78" should read --sleeve 73--.
Line 65, "slidden," should read --slid,--.

COLUMN 23

Line 50, "reach" should read --reaches--.

COLUMN 24

Line 46, "area 4a" should read --4b--.
Line 47, "adhere" should read --adhere to--.

COLUMN 25

Line 38, "one component" should read --one-component--.

UNITED STATES PATENT AND TRADEMARK OFFICE
CERTIFICATE OF CORRECTION

PATENT NO. : 5,032,485
DATED : July 16, 1991
INVENTOR(S) : JUNICHIRO KANBE ET AL.

It is certified that error appears in the above-identified patent and that said Letters Patent is hereby corrected as shown below:

<u>COLUMN 26</u>

Line 23, "regulating member" should read
        --a regulating member--.

Signed and Sealed this

Seventeenth Day of August, 1993

Attest:

BRUCE LEHMAN

*Attesting Officer*    *Commissioner of Patents and Trademarks*